(12) United States Patent
Mitsuda et al.

(10) Patent No.: US 7,136,884 B2
(45) Date of Patent: Nov. 14, 2006

(54) FILE MANAGING METHOD AND DATA RECORDER USING THE SAME, DATA REPRODUCING APPARATUS, DATA RECORDING/REPRODUCING APPARATUS, AND DISK RECORDED BY THE FILE MANAGING METHOD

(75) Inventors: Makoto Mitsuda, Ibaraki (JP);
Masanori Ito, Moriguchi (JP);
Masafumi Shimotashiro, Katano (JP);
Tadashi Nakamura, Nara (JP);
Yasumori Hino, Ikoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 369 days.

(21) Appl. No.: 10/220,368

(22) PCT Filed: Feb. 28, 2001

(86) PCT No.: PCT/JP01/01542

§ 371 (c)(1),
(2), (4) Date: Aug. 28, 2002

(87) PCT Pub. No.: WO01/65374

PCT Pub. Date: Sep. 7, 2001

(65) Prior Publication Data
US 2003/0014586 A1   Jan. 16, 2003

(30) Foreign Application Priority Data
Mar. 1, 2000 (JP) .......................... 2000-056354
Jan. 10, 2001 (JP) .......................... 2001-002256

(51) Int. Cl.
*G06F 12/00* (2006.01)

(52) U.S. Cl. .................... 707/205; 711/112; 711/170

(58) Field of Classification Search ............. 711/170, 711/171, 205, 207, 112; 386/124, 125, 95, 386/69, 70, 113; 707/205
See application file for complete search history.

(56) References Cited

U.S. PATENT DOCUMENTS

| 4,791,623 | A | * | 12/1988 | Deiotte ................. 369/59.25 |
| 5,226,163 | A | * | 7/1993 | Karsh et al. ............ 707/200 |
| 5,463,772 | A | * | 10/1995 | Thompson et al. ....... 707/101 |
| 5,799,212 | A | * | 8/1998 | Ohmori .................. 710/73 |

(Continued)

FOREIGN PATENT DOCUMENTS

JP      8-95835       4/1996

(Continued)

OTHER PUBLICATIONS

English translation of "Unix Magazine" Oct. 1, 1995, pp. 78-87.

(Continued)

*Primary Examiner*—Reginald G. Bragdon
*Assistant Examiner*—Mehdi Namazi
(74) *Attorney, Agent, or Firm*—Hamre, Schumann, Mueller & Larson, P.C.

(57) ABSTRACT

A file management method for reducing a seek operation to a minimum even when a UDF file system is used is provided. The file management method has file management information for managing contiguous blocks on a disc as an extent and for grouping the extent as a file and managing the file, and includes the steps of: when creating a new directory on the disc, reserving as a reserved area for recording file management information on the file a file or a data area in the directory; and reserving a directory block having a predetermined size in the reserved area for recording a file entry of the directory and a file identifier descriptor of the directory.

13 Claims, 32 Drawing Sheets

| BP | Contents of data | |
|---|---|---|
| 0~3 | Starting LBN of reserved area | 0×00000057 |
| 4~7 | Ending LBN of reserved area | 0×000000FA |
| 8~11 | Starting LBN of file entry | 0×000000FA |
| 12~15 | Starting LBN of file attribute information | 0×00000058 |
| 16~27 | Last updated date and time | |
| 28 | General changed-state indication flag | |
| 29~31 | Reserved | 0×000000 |
| 32~1711 | Block map | See B in detail |
| 1711~2047 | Reserved | 0×00 |

U.S. PATENT DOCUMENTS

| | | | |
|---|---|---|---|
| 6,292,625 B1 | 9/2001 | Gotoh et al. | |
| 6,665,690 B1* | 12/2003 | Kimura et al. | 707/205 |
| 6,674,472 B1* | 1/2004 | Tsutsui | 348/333.05 |
| 6,823,398 B1* | 11/2004 | Lee et al. | 710/5 |
| 6,929,477 B1* | 8/2005 | Fukushima | 434/118 |
| 2002/0152349 A1* | 10/2002 | Kageyama et al. | 711/1 |

FOREIGN PATENT DOCUMENTS

| | | |
|---|---|---|
| JP | 9-179758 | 7/1997 |
| WO | WO 98/14938 | 4/1998 |

OTHER PUBLICATIONS

English translation of "ACOS software, ACOS-4/MVP XE Data Management Manual, ver. 7" Sep. 1989, pp. 137-152.

English translation of "Minix Operating System" Apr. 21, 1989, pp. 297-311.

Goto et al. "Outline of DVD File System UDF Bridge" National Technical Report, vol. 43, No. 3, Jun. 1997, pp. 123-128.

Optical Storage Technology Association (OSTA): "Universal Disk Format Specification OSTA-2, Revision 2.00" 1998 XP002113791.

McKusick, et al., "A fast file system for UNIX", Computer Systems, (Online) 1984, Retrieved from the Internet: URL:http://citeseer.ist.psu.edu/mckusick84fast.html> (retrieved on Apr. 3, 2006) XP002375447.

* cited by examiner

| LBN | Contents of data |
|---|---|
| 0~79 | Space bitmap descriptor |
| 80 | File set descriptor |
| 81 | Terminating descriptor |
| 82 | File entry (Root) |
| 83 | File identifier descriptor (parent directory) |
| | File identifier descriptor (AV_DIR1) |
| 84 | File entry (AV_DIR1) |
| 85 | File identifier descriptor (parent directory) |
| | File identifier descriptor (AVFILES.IFO) |
| 86 | File entry (AVFILES.IFO) |
| 87 | Management area of AVFILES.IFO |
| 88~250 | Extent of AVFILES.IFO (Allocated and not recorded) |
| 251~ Last LBN | Unallocated |

FIG. 3

| BP | Contents of data | |
|---|---|---|
| 0~3 | Starting LBN of reserved area | 0×00000057 |
| 4~7 | Ending LBN of reserved area | 0×000000FA |
| 8~11 | Starting LBN of file entry | 0×000000FA |
| 12~15 | Starting LBN of file attribute information | 0×00000058 |
| 16~27 | Last updated date and time | |
| 28 | General changed-state indication flag | |
| 29~31 | Reserved | 0×000000 |
| 32~1711 | Block map | See B in detail |
| 1711~2047 | Reserved | 0×00 |

FIG. 4A

| | |
|---|---|
| LSB | |
| 1 | |
| 2 | |
| 3 | Reserved |
| 4 | |
| 5 | |
| 6 | |
| 7 | Changed or not |
| MSB | Used or not |

FIG. 4B

| LBN | Contents of data |
|---|---|
| 0~79 | Space bitmap descriptor |
| 80 | File set descriptor |
| 81 | Terminating descriptor |
| 82 | File entry (Root) |
| 83 | File identifier descriptor (parent directory) |
| | File identifier descriptor (AV_DIR1) |
| 84 | File entry (AV_DIR1) |
| 85 | File identifier descriptor (parent directory) |
| | File identifier descriptor (AVFILES.IFO) |
| | File identifier descriptor (FILE1.DAT) |
| | File identifier descriptor (FILE2.DAT) |
| 86 | File entry (AVFILES.IFO) |
| 87 | Management area of AVFILES.IFO |
| 88 | File attribute information (FILE1.DAT) |
| 89 | File attribute information (FILE2.DAT) |
| 90~248 | Extent of AVFILES.IFO (Allocated and not recorded) |
| 249 | File entry (FILE1.DAT) |
| 250 | File entry (FILE2.DAT) |
| 251~400 | Extent of FILE1.DAT (AV stream) |
| 401~700 | Extent of FILE2.DAT (AV stream) |
| 701~ Last LBN | Unallocated |

FIG. 7

| LBN | | Contents of data |
|---|---|---|
| 0~79 | | Space bitmap descriptor |
| 80 | | File set descriptor |
| 81 | | Terminating descriptor |
| 82 | | File entry (Root) |
| 83 | | File identifier descriptor (parent directory) |
| | | File identifier descriptor (AV_DIR1) |
| 84 | | File entry (AV_DIR1) |
| 85 | | File identifier descriptor (parent directory) |
| | | File identifier descriptor (AVFILES.IFO) |
| 86 | | File entry (AVFILES.IFO) |
| 87 | | Management area of AVFILES.IFO |
| 88~250 | 88~169 | Extent of AVFILES.IFO (Allocated and not recorded) |
| | 170~250 | Extent of AVFILES.IFO (Allocated and not recorded) |
| 251~ Last LBN | | Unallocated |

FIG. 8

| BP | Contents of data | |
|---|---|---|
| 0~3 | Starting LBN of reserved area | 0×00000057 |
| 4~7 | Ending LBN of reserved area | 0×000000FA |
| 8~11 | Starting LBN of file entry | 0×000000AA |
| 12~15 | Starting LBN of file attribute information | 0×00000058 |
| 16~27 | Last updated date and time | |
| 28 | General changed-state indication flag | |
| 29~31 | Reserved | 0×000000 |
| 32~1711 | Block map | See B in detail |
| 1711~2047 | Reserved | 0×00 |

FIG. 9A

| LSB | |
|---|---|
| 1 | |
| 2 | |
| 3 | Reserved |
| 4 | |
| 5 | |
| 6 | |
| 7 | Changed or not |
| MSB | Used or not |

FIG. 9B

| LBN | | | Contents of data |
|---|---|---|---|
| 0~79 | | | Space bitmap descriptor |
| 80 | | | File set descriptor |
| 81 | | | Terminating descriptor |
| 82 | | | File entry (Root) |
| 83 | | | File identifier descriptor (parent directory) |
| | | | File identifier descriptor (AV_DIR1) |
| 84 | | | File entry (AV_DIR1) |
| 85 | | | File identifier descriptor (parent directory) |
| | | | File identifier descriptor (AVFILES.IFO) |
| | | | File identifier descriptor (FILE1.DAT) |
| | | | File identifier descriptor (FILE2.DAT) |
| 86 | | | File entry (AVFILES.IFO) |
| 87 | | | Management area of AVFILES.IFO |
| 88~250 | 88~169 | 88 | File attribute information (FILE1.DAT) |
| | | 89 | File attribute information (FILE2.DAT) |
| | | 90~169 | Extent of AVFILES.IFO (Allocated and not recorded) |
| | 170~250 | 170 | File entry (FILE1.DAT) |
| | | 171 | File entry (FILE2.DAT) |
| | | 172~250 | Extent of AVFILES.IFO (Allocated and not recorded) |
| 251~400 | | | Extent of FILE1.DAT (AV stream) |
| 401~700 | | | Extent of FILE2.DAT (AV stream) |
| 701~Last LBN | | | Unallocated |

FIG. 10

| LBN | Contents of data |
|---|---|
| 0~93 | Space bitmap descriptor |
| 94 | File set descriptor |
| 95 | Terminating descriptor |
| 96 | File entry(Root) |
| 97~127 | File identifier descriptor(parent directory)<br>File identifier descriptor(AV_DIR1) |
| 128 | File entry(AV_DIR1) |
| 129~159 | File identifier descriptor(Root)<br>File identifier descriptor(AV_IF0)<br>File identifier descriptor(AV_DIR11)<br>File identifier descriptor(AV_DIR21)<br>File identifier descriptor(AV_DIR31)<br>File identifier descriptor(AV_DIR41) |
| 160 | File entry(AV_IF0) |
| 161~191 | File identifier descriptor(AV_IF0)<br>File identifier descriptor(AVFILE.IF0) |
| 192 | File entry(AVFILES.IF0) |
| 193~223 | AVFILES.IF0 |
| 224 | File entry(AV_DIR11) |
| 225~231 | File identifier descriptor(AV_DIR11) |
| 232~255 | Extent of AVFILES.IF0<br>(Allocated and not recorded) |
| 256 | File entry(AV_DIR21) |
| 257~263 | File identifier descriptor(AV_DIR21) |
| 264~287 | Extent of AVFILES.IF0<br>(Allocated and not recorded) |
| 288 | File entry(AV_DIR31) |
| 289~295 | File identifier descriptor(AV_DIR31) |
| 296~319 | Extent of AVFILES.IF0<br>(Allocated and not recorded) |
| 320 | File entry(AV_DIR41) |
| 321~327 | File identifier descriptor(AV_DIR41) |
| 328~351 | Extent of AVFILES.IF0<br>(Allocated and not recorded) |
| 352~383 | Extent of AVFILES.IF0<br>(Allocated and not recorded) |
| 384~384+A | Extent of AVFILES.IF0<br>(Allocated and not recorded) |
| 384+A+1~<br>384+A*2 | Extent of AVFILES.IF0<br>(Allocated and not recorded) |
| 384+A*2+1<br>~384+A*3 | Extent of AVFILES.IF0<br>(Allocated and not recorded) |
| 384+A*3+1<br>~384+A*4 | Extent of AVFILES.IF0<br>(Allocated and not recorded) |
| 416+A*4+1<br>~Z | Extent of AVFILES.IF0<br>(Allocated and not recorded) |
| Z+1~<br>Last LBN | Unallocated |

FIG. 12

| . . . . . | . . . . . |
|---|---|
| 224 | File entry(AV_DIR11) |
| 225~231 | File identifier descriptor(AV_DIR11) |
| | File identifier descriptor(Video_FILE11) |
| 232~255 | Extent of AVFILES.IFO (Allocated and not recorded) |
| 256 | File entry(AV_DIR21) |
| 257~263 | File identifier descriptor(AV_DIR21) |
| | File identifier descriptor(Audio_FILE21) |
| 264~287 | Extent of AVFILES.IFO (Allocated and not recorded) |
| 288 | File entry(AV_DIR31) |
| 289~295 | File identifier descriptor(AV_DIR31) |
| | File identifier descriptor(Photo_FILE31) |
| 296~319 | Extent of AVFILES.IFO (Allocated and not recorded) |
| 320 | File entry(AV_DIR41) |
| 321~327 | File identifier descriptor(AV_DIR41) |
| | File identifier descriptor(Other_FILE41) |
| 328~351 | Extent of AVFILES.IFO (Allocated and not recorded) |
| . . . . . | . . . . . |
| Z | File entry(Video_FILE11) |
| Z+1~V | Actual data of file(Video_FILE11) |
| V+1 | File entry(Audio_FILE21) |
| Y+2~W | Actual data of file(Audio_FILE21) |
| W+1 | File entry(Photo_FILE31) |
| W+2~X | Actual data of file(Photo_FILE31) |
| X+1 | File entry(Other_FILE41) |
| X+2~Y | Actual data of file(Other_FILE41) |
| Y+1~ Last LBN | Unallocated |

FIG. 14

| . . . . . | . . . . . |
|---|---|
| 224 | File entry(AV_DIR11) |
| 225~231 | File identifier descriptor(AV_DIR11) |
| | File identifier descriptor(Video_FILE11) |
| 232~255 | Extent of AVFILES.IFO (Allocated and not recorded) |
| 256 | File entry(AV_DIR21) |
| 257~263 | File identifier descriptor(AV_DIR21) |
| | File identifier descriptor(Audio_FILE21) |
| 264~287 | Extent of AVFILES.IFO (Allocated and not recorded) |
| 288 | File entry(AV_DIR31) |
| 289~295 | File identifier descriptor(AV_DIR31) |
| | File identifier descriptor(Photo_FILE31) |
| 296~319 | Extent of AVFILES.IFO (Allocated and not recorded) |
| 320 | File entry(AV_DIR41) |
| 321~327 | File identifier descriptor(AV_DIR41) |
| | File identifier descriptor(Other_FILE41) |
| 328~351 | Extent of AVFILES.IFO (Allocated and not recorded) |
| 352~383 | Extent of AVFILES.IFO (Allocated and not recorded) |
| 384~384+A | File entry(Video_FILE11) |
| | File attribute information(VFILE11.DAT) |
| | Extent of AVFILES.IFO (Allocated and not recorded) |
| 384+A+1~ 384+A*2 | File entry(Audio_FILE21) |
| | File attribute information(AFILE21.DAT) |
| | Extent of AVFILES.IFO (Allocated and not recorded) |
| 384+A*2+1 ~384+A*3 | File entry(Photo_FILE31) |
| | File attribute information(PFILE31.DAT) |
| | Extent of AVFILES.IFO (Allocated and not recorded) |
| 384+A*3+1 ~384+A*4 | File entry(Other_FILE41) |
| | File attribute information(OFILE41.DAT) |
| | Extent of AVFILES.IFO (Allocated and not recorded) |
| 384+A*4+1 ~Z | Extent of AVFILES.IFO (Allocated and not recorded) |
| Z+1~V | Actual data of file(Video_FILE11) |
| V+1~W | Actual data of file(Audio_FILE21) |
| W+1~X | Actual data of file(Photo_FILE31) |
| X+1~Y | Actual data of file(Other_FILE41) |
| Y+1~ Last LBN | Unallocated |

FIG. 15

| | |
|---|---|
| 128 | File entry(AV_DIR0) |
| 129~159 | File identifier descriptor(Root) |
| | File identifier descriptor(AV_IFO) |
| | File identifier descriptor(AV_DIR11) |
| | File identifier descriptor(AV_DIR21) |
| | File identifier descriptor(AV_DIR31) |
| | File identifier descriptor(AV_DIR41) |
| | File identifier descriptor(AV_DIR12) |
| ..... | ..... |
| 224 | File entry(AV_DIR11) |
| 225~231 | File identifier descriptor(AV_DIR11) |
| | File identifier descriptor(AV_FILE1) |
| | File identifier descriptor(AV_FILE2) |
| | ..... |
| | File identifier descriptor(AV_FILE_A) |
| 232 | File entry(AV_DIR12) |
| 233~239 | File identifier descriptor(AV_DIR12) |
| | File identifier descriptor(AV_FILE_A+1) |
| 240~255 | Extent of AVFILES.IFO (Allocated and not recorded) |
| ..... | ..... |
| 384~384+A | File entry(AV_FILE1) |
| | ..... |
| | File entry(AV_FILE_A) |
| | File attribute information(FILE11.DAT) |
| | ..... |
| | File attribute information(FILE_A.DAT) |
| ..... | ..... |
| 384+A*4+1 ~ 384+A*5 | File entry(AV_FILE_A+1) |
| | File attribute information(FILE_A+1.DAT) |
| | Extent of AVFILES.IFO (Allocated and not recorded) |
| 384+A*5+1 ~ Z | Extent of AVFILES.IFO (Allocated and not recorded) |
| Z+1~V | Actual data of file(AV_FILE11) |
| ..... | ..... |
| W~X | Actual data of file(AV_FILE_A) |
| X+1~Y | Actual data of file(AV_FILE_A+1) |
| Y+1~ Last LBN | Unallocated |

FIG. 16

| | |
|---|---|
| 128 | File entry(AV_DIR0) |
| 129~159 | File identifier descriptor(Root) |
| | File identifier descriptor(AV_IF0) |
| | File identifier descriptor(AV_DIR11) |
| | File identifier descriptor(AV_DIR21) |
| | File identifier descriptor(AV_DIR31) |
| | File identifier descriptor(AV_DIR41) |
| | File identifier descriptor(AV_DIR12) |
| | File identifier descriptor(AV_DIR13) |
| | File identifier descriptor(AV_DIR14) |
| ..... | ..... |
| 224 | File entry(AV_DIR11) |
| 225~231 | File identifier descriptor(AV_DIR11) |
| | File identifier descriptor(AV_FILE1) |
| | ..... |
| | File identifier descriptor(AV_FILE1_A) |
| ..... | ..... |
| 232 | File entry(AV_DIR14) |
| 233~239 | File identifier descriptor(AV_DIR14) |
| | File identifier descriptor(AV_FILE_A*3+1) |
| | ..... |
| | File identifier descriptor(AV_FILE_A*4) |
| ..... | ..... |
| 352~383 | Extent of AVFILES.IFO (Allocated and not recorded) |
| 384~384+A | File entry(AV_FILE1) |
| | ..... |
| | File entry(AV_FILE_A) |
| | File attribute information(FILE11.DAT) |
| | ..... |
| | File attribute information(FILE_A.DAT) |
| ..... | ..... |
| 384+A*6+1 ~ 384+A*7 | File entry(AV_FILE_A*3+1) |
| | ..... |
| | File entry(AV_FILE_A*4) |
| | File attribute information(FILE_A*3+1.DAT) |
| | ..... |
| | File attribute information(FILE_A*4.DAT) |
| 384+A*7+1 ~Z | Extent of AVFILES.IFO (Allocated and not recorded) |
| Z+1~V | Actual data of file(AV_FILE11) |
| ..... | ..... |
| W~X | Actual data of file(AV_FILE_A*4) |
| X+1~ Last LBN | Unallocated |

FIG. 17

| | |
|---|---|
| 128 | File entry(AV_DIR0) |
| 129~159 | File identifier descriptor(Root) |
| | File identifier descriptor(AV_IF0) |
| | File identifier descriptor(AV_DIR11) |
| | File identifier descriptor(AV_DIR21) |
| | File identifier descriptor(AV_DIR31) |
| | File identifier descriptor(AV_DIR41) |
| | File identifier descriptor(AV_DIR12) |
| | File identifier descriptor(AV_DIR13) |
| | File identifier descriptor(AV_DIR14) |
| | File identifier descriptor(AV_DIR15) |
| ..... | ..... |
| 352 | File entry(AV_DIR15) |
| 353~359 | File identifier descriptor(AV_DIR15) |
| | File identifier descriptor(AV_FILE_A*4+1) |
| 360~383 | Extent of AVFILES.IFO (Allocated and not recorded) |
| ..... | ..... |
| 384+A*6+1 ~ 384+A*7 | File entry(AV_FILE_A*3+1) |
| | ..... |
| | File entry(AV_FILE_A*4) |
| | File attribute information(FILE_A*3+1.DAT) |
| | ..... |
| | File attribute information(FILE_A*4.DAT) |
| 384+A*7+1 ~ 384+A*8 | File entry(AV_FILE_A*4+1) |
| | File attribute information(FILE_A*4+1.DAT) |
| | Extent of AVFILES.IFO (Allocated and not recorded) |
| 384+A*8+1 ~Z | Extent of AVFILES.IFO (Allocated and not recorded) |
| Z+1~V | Actual data of file(AV_FILE11) |
| ..... | ..... |
| W+1~X | Actual data of file(AV_FILE_A*4) |
| X+1~Y | Actual data of file(AV_FILE_A*4+1) |
| Y+1~ Last LBN | Unallocated |

FIG. 18

| | |
|---|---|
| 128 | File entry(AV_DIR0) |
| 129~159 | File identifier descriptor(Root) |
| | File identifier descriptor(AV_IF0) |
| | File identifier descriptor(AV_DIR11) |
| | File identifier descriptor(AV_DIR21) |
| | File identifier descriptor(AV_DIR31) |
| | File identifier descriptor(AV_DIR41) |
| | File identifier descriptor(AV_DIR12) |
| | ..... |
| | File identifier descriptor(AV_DIR18) |
| ..... | ..... |
| 224 | File entry(AV_DIR11) |
| 225~231 | File identifier descriptor(AV_DIR11) |
| | File identifier descriptor(AV_FILE1) |
| | ..... |
| | File identifier descriptor(AV_FILE_A) |
| ..... | ..... |
| 376 | File entry(AV_DIR18) |
| 376~383 | File identifier descriptor(AV_DIR18) |
| | File identifier descriptor(AV_FILE_A*7+1) |
| | ..... |
| | File identifier descriptor(AV_FILE_A*8) |
| 384~384+A | File entry(AV_FILE1) |
| | ..... |
| | File entry(AV_FILE_A) |
| | File attribute information(FILE11.DAT) |
| | ..... |
| | File attribute information(FILE_A.DAT) |
| ..... | ..... |
| 384+A*10+1 ~ 384+A*11 | File entry(AV_FILE_A*7+1) |
| | ..... |
| | File entry(AV_FILE_A*8) |
| | File attribute information(FILE_A*7+1.DAT) |
| | ..... |
| | File attribute information(FILE_A*8.DAT) |
| 384+A*11+1 ~Z | Extent of AVFILES.IFO (Allocated and not recorded) |
| Z+1~V | Actual data of file(AV_FILE11) |
| ..... | ..... |
| W~X | Actual data of file(AV_FILE_A*8) |
| X+1~ Last LBN | Unallocated |

FIG. 19

| | |
|---|---|
| 128 | File entry(AV_DIR0) |
| 129~159 | File identifier descriptor(Root) |
| | File identifier descriptor(AV_IF0) |
| | File identifier descriptor(AV_DIR11) |
| | File identifier descriptor(AV_DIR21) |
| | File identifier descriptor(AV_DIR31) |
| | File identifier descriptor(AV_DIR41) |
| | File identifier descriptor(AV_DIR12) |
| | ..... |
| | File identifier descriptor(AV_DIR18) |
| | File identifier descriptor(AV_DIR19) |
| ..... | ..... |
| 376 | File entry(AV_DIR18) |
| 377~383 | File identifier descriptor(AV_DIR18) |
| | File identifier descriptor(AV_FILE_A*7+1) |
| | ..... |
| | File identifier descriptor(AV_FILE_A*8) |
| ..... | ..... |
| 384+A*10+1 ~ 384+A*11 | File entry(AV_FILE_A*7+1) |
| | ..... |
| | File entry(AV_FILE_A*8) |
| | File attribute information(FILE_A*7+1.DAT) |
| | ..... |
| | File attribute information(FILE_A*8.DAT) |
| 384+A*11+1 | File entry(AV_DIR19) |
| 384+A*11+2~ 384+A*11+8 | File identifier descriptor(AV_DIR19) |
| | File identifier descriptor(AV_FILE_A*8+1) |
| 384+A*11+9~ 384+A*11+32 | Extent of AVFILES.IFO (Allocated and not recorded) |
| 384+A*11+33 ~ 384+A*12+32 | File entry(AV_FILE_A*8+1) |
| | File attribute information(FILE_A*8+1.DAT) |
| | Extent of AVFILES.IFO (Allocated and not recorded) |
| 384+A*12+33 ~Z | Extent of AVFILES.IFO (Allocated and not recorded) |
| Z+1~V | Actual data of file(AV_FILE11) |
| ..... | ..... |
| W+1~X | Actual data of file(AV_FILE_A*8) |
| X+1~Y | Actual data of file(AV_FILE_A*8+1) |
| Y+1~ Last LBN | Unallocated |

FIG. 20

| | |
|---|---|
| 128 | File entry(AV_DIR0) |
| 129~159 | File identifier descriptor(Root) |
| | File identifier descriptor(AV_IFO) |
| | File identifier descriptor(AV_DIR11) |
| | File identifier descriptor(AV_DIR21) |
| | File identifier descriptor(AV_DIR31) |
| | File identifier descriptor(AV_DIR41) |
| | File identifier descriptor(AV_DIR12) |
| | ..... |
| | File identifier descriptor(AV_DIR112) |
| ..... | ..... |
| 224 | File entry(AV_DIR11) |
| 225~231 | File identifier descriptor(AV_DIR11) |
| | File identifier descriptor(AV_FILE1) |
| | ..... |
| | File identifier descriptor(AV_FILE_A) |
| ..... | ..... |
| 384+A*11+24 | File entry(AV_DIR112) |
| 384+A*11+26 ~ 384+A*11+32 | File identifier descriptor(AV_DIR112) |
| | File identifier descriptor(AV_FILE_A*11+1) |
| | ..... |
| | File identifier descriptor(AV_FILE_A*12) |
| ..... | ..... |
| 384+A*14+33 ~ Z | File entry(AV_FILE_A*11+1) |
| | ..... |
| | File entry(AV_FILE_A*12) |
| | File attribute information(FILE_A*11+1.DAT) |
| | ..... |
| | File attribute information(FILE_A*12.DAT) |
| Z+1~V | Actual data of file(AV_FILE11) |
| ..... | ..... |
| W+1~X | Actual data of file(AV_FILE_A*8) |
| X+1~Y | Actual data of file(AV_FILE_A*8+1) |
| Y+1~ Last LBN | Unallocated |

FIG. 21

| | |
|---|---|
| 128 | File entry(AV_DIR0) |
| 129~159 | File identifier descriptor(Root) |
| | File identifier descriptor(AV_IF0) |
| | File identifier descriptor(AV_DIR11) |
| | File identifier descriptor(AV_DIR21) |
| | File identifier descriptor(AV_DIR31) |
| | File identifier descriptor(AV_DIR41) |
| | File identifier descriptor(AV_DIR12) |
| | ..... |
| | File identifier descriptor(AV_DIR112) |
| | File identifier descriptor(AV_DIR113) |
| ...... | ..... |
| 384+A*14+33 ~ Z | File entry(AV_FILE_A*11+1) |
| | ..... |
| | File entry(AV_FILE_A*12) |
| | File attribute information(FILE_A*11+1.DAT) |
| | ..... |
| | File attribute information(FILE_A*12.DAT) |
| Z+1~V | Actual data of file(AV_FILE11) |
| ...... | ..... |
| W+1~X | Actual data of file(AV_FILE_A*12) |
| X+1 | File entry(AV_DIR113) |
| X+2~X+8 | File identifier descriptor(AV_DIR113) |
| | File identifier descriptor(AV_FILE_A*12+1) |
| X+9~X+32 | Extent of AVFILES.IFO (Allocated and not recorded) |
| X+32~Y | Extent of AVFILES.IFO (Allocated and not recorded) |
| Y+1~ Y+A | File entry(AV_FILE_A*12+1) |
| | File attribute information(FILE_A*12.DAT) |
| | Extent of AVFILES.IFO (Allocated and not recorded) |
| Y+A+1~ ZZ | Extent of AVFILES.IFO (Allocated and not recorded) |
| ZZ+1~YY | Actual data of file(AV_FILE_A*12+1) |
| YY+1~ Last LBN | Unallocated |

FIG. 22

| LBN | Contents of data |
|---|---|
| 0~79 | Space bitmap descriptor |
| 80 | File set descriptor |
| 81 | Terminating descriptor |
| 82 | File entry (Root directory) |
| 83 | Root directory |
| 84 | File entry (Dir1 directory) |
| 85 | Dir1 directory |
| 84 | File entry (File1_1) |
| 85~100 | Extent of File1_1 |
| 101 | File entry (File1_2) |
| 102~200 | Extent of File1_2 |
| 201~Last LBN | Unallocated |

FIG. 25
PRIOR ART

| BP | Length | Field Name | Contents |
|---|---|---|---|
| 0 | 16 | Descriptor tag | tag |
| 16 | 20 | ICB tag | icbtag |
| ... | ... | ... | ... |
| 172 | 4 | Allocation descriptor length | Unit32 |
| 176 | L_EA | Extended attribute | bytes |
| a | L_AD | Allocation descriptor | bytes |

FIG. 27
PRIOR ART

| RBP | Length | Field Name | Contents |
|---|---|---|---|
| 0 | 4 | Extent length | Unit32 |
| 4 | 4 | Extent location | Unit32 |

FIG. 28
PRIOR ART

| Value | Interpretation |
|---|---|
| 0 | Allocated and recorded extent |
| 1 | Allocated and not reocrded extent |
| 2 | Unallocated and not recorded extent |
| 3 | Extent continuing from the allocation descriptor |

FIG. 29
PRIOR ART

| LBN | Contents of data |
|---|---|
| 85 | File identifier descriptor (parent directory) |
| | File identifier descriptor (FILE1_1) |
| | File identifier descriptor (FILE1_2) |

FIG. 30
PRIOR ART

| LBN | Contents of data |
|---|---|
| 0~79 | Space bitmap descriptor |
| 80 | File set descriptor |
| 81 | Terminating descriptor |
| 82 | File entry(Root directory) |
| 83 | Root directory |
| 84 | File entry(Dir1 directory) |
| 85 | Dir1 directory |
| 86 | File entry(File1_1) |
| 86~100 | Extent of File1_1 |
| 101 | File entry(File1_2) |
| 102~200 | Extent of File1_2 |
| 201 | File entry(File1_3) |
| 202~300 | Extent of File1_3 |
| 301~Last LBN | Unallocated |

FIG. 32
PRIOR ART

FILE MANAGING METHOD AND DATA RECORDER USING THE SAME, DATA REPRODUCING APPARATUS, DATA RECORDING/REPRODUCING APPARATUS, AND DISK RECORDED BY THE FILE MANAGING METHOD

TECHNICAL FIELD

The present invention relates to a file management method suitable for recording and reproducing AV data such as digital images, and a data recording apparatus, a data reproducing apparatus and a data recording/reproducing apparatus using the method.

BACKGROUND ART

Recently, with development of high-density optical discs, the optical discs have been used increasingly as recording media for digital images including moving images. The application fields of the optical discs are so wide that they are utilized not only as peripheral equipment of a computer but also in a video player for home use. In the future, it is anticipated that the optical discs will be used as recording media for video recording to replace tape media.

In order to deal with data in common in such a wide application area, data is managed usually in the logical unit of a file. As one of such file management methods, a file system in a format according to the Universal Disk Format (UDF) specification is available.

The UDF specification acts to ensure the medium compatibility among various operating systems (OS) for computers, and also is employed in a DVD video player for consumer appliances. This specification is one of the file formats that is expected to be applied in a wider variety of platforms in the future.

The following describes a file management method using a format according to the UDF specification, with reference to a drawing. FIG. 23 shows an example of the construction of a data recording/reproducing apparatus to which a conventional file management method is applied.

In FIG. 23, numeral 101 denotes a disc such as an optical magnetic disc. Numeral 102 denotes a recording medium driving unit, and in the case of the disc 101 being an optical magnetic disc, this unit is composed of a spindle motor or the like. Numeral 103 denotes a recording/reproducing unit, and in the case of the disc 101 being an optical magnetic disc, this unit is composed of an optical pickup, a magnetic head, a servo circuit, a modulation demodulation circuit and the like.

In addition, numeral 104 denotes a memory unit, which stores data temporarily at the time of recording/reproducing data. Numeral 105 denotes a disc driving unit, and is composed of the disc 101, the recording medium driving unit 102, the recording/reproducing unit 103 and the memory unit 104.

Further, numeral 106 denotes an AV signal processing unit, which carries out processing such as MPEG compression with respect to an AV input signal input from a CCD camera or the like, and MPEG decompression with respect to AV data read from the disc 101 to output to a monitor or the like. Numeral 107 denotes a system control unit, which controls the AV signal processing unit 106 and the disc driving unit 105.

In the data recording/reproducing apparatus constructed in this way, at the time of recording data, an AV signal input into the AV signal processing unit 106 is subjected to image compression processing according to the MPEG method or the like, and then is transferred to the memory unit 104 in the control of the system control unit 107.

Next, the recording medium driving unit 102 and the recording/reproducing unit 103 operate in the control of the system control unit 107 so that data in the memory unit 104 is recorded on the disc 101.

At the time of reproducing data, the recording medium driving unit 102 and the recording/reproducing unit 103 operate in the control of the system control unit 107 so that data recorded in the disc 101 is transferred to the memory unit 104.

Next, in the control of the system control unit 107, data is read from the memory unit 104 and the AV signal processing unit 106 outputs the data as an AV signal.

The following describes an example of a structure of the UDF file system that is a conventional file management method, with reference to a drawing. FIG. 24 shows a structure of a volume space of the UDF constructed in the disc 101. In FIG. 24, in order to manage the disc 101 as a logical volume, the disc 101 is divided into a unit called a sector, and logical sector numbers (LSN) from 0 to the Last LSN are assigned to the sectors. Also, at the beginning and the termination of the volume space, volume structures are recorded. Further, between these volume structures, a partition space for recording structure information on a file and a file as user data is allocated.

In the partition space, logical block numbers (LBN) from 0 to the Last LBN are assigned to each sector beginning from the leading sector. FIG. 25 shows the structure of the partition space when the directory structure shown in FIG. 26 is recorded on the disc 101 (it should be noted that the following description refers to parameters specified in the DVD-RAM standard).

In FIG. 26, a directory DIR1 is present under the ROOT directory, and FILE1_1 and FILE 1_2 are present under the DIR1. In this state, in FIG. 25, a space bitmap descriptor is recorded at LBN=0 to 79.

The space bit map descriptor has a space bitmap indicating whether each logical block can be allocated or not. Each bit in the space bitmap corresponds to each logical block, where this bit value of "1" means an unallocated state of the logical block, and "0" means an allocated state.

At LBN=80, a file set descriptor is recorded. In the file set descriptor, location information on a file entry in the ROOT directory is recorded. The file entry will be described later in detail.

At LBN=81, a terminating descriptor is recorded. The terminating descriptor represents a termination of the file set descriptor.

At LBN=82, the file entry of the ROOT directory is recorded. The file entry is used for storing various attribute information specific to each file, information concerning a time stamp, a recorded location of the file, the size of the file and the like and for managing the file as a group of extents. The extent will be described later in detail.

FIG. 27 is an example of a structure of the file entry. In FIG. 27, at a descriptor tag field, information for discriminating among various descriptors such as a space bitmap descriptor, a file set descriptor and a file entry in the partition space is recorded. In the case of the file entry, it is specified to describe a value "261". At an information control block (ICB) tag field, attribute information concerning the file entry itself is recorded. An extended attribute field is used for describing the attribute information other than that specified in the attribute information field in the file entry. At an allocation descriptor field, allocation descriptors are recorded in a required number for managing a contiguous area of logical blocks as one extent.

FIG. 28 shows a structure of the allocation descriptor. In the allocation descriptor, an extent is represented by the extent length and the extent location.

FIG. 29 shows an interpretation on the upper 2 bits in the extent length included in the allocation descriptor. The upper 2 bits represent an allocation state and a recording state of the extent.

The value of "0" represents an allocated and recorded extent, and data of the file is recorded. The value of "1" represents an allocated and not recorded extent, and the area is allocated to a specific file/directory but the data is not recorded therein. The value of "2" represents an unallocated and not recorded extent, where no data is recorded. The value of "3" represents an extent continuing from the allocation descriptor. At the allocation descriptor field in a file entry, a plurality of allocation descriptors can be recorded, so that one file is constructed by a group of extents managed with these allocation descriptors.

In the directory, a filename of a file included in the directory and location information on the file entry are recorded. According to the UDF, a directory is one type of files, and is recorded at LBN=83 and LBN=85 in FIG. 25.

FIG. 30 shows an example of a structure of the directory file recorded at LBN=85. The directory file is constructed with a plurality of file identifier descriptors, each of which has information concerning each file included in the directory. Major information possessed by each file identifier descriptor is a filename of the corresponding file and location information on the file entry.

The following describes an operation where the data recording/reproducing apparatus reads a desired file from a disc having the above-described UDF file system structure. FIG. 31 shows a logical structure of a directory/file in the file management information conforming to the UDF specification.

In FIG. 31, a file set descriptor is recorded at a predetermined location in the partition space as a part of the file management information. In the file set descriptor, a recording location of a file entry for a ROOT directory file is stored. In the file identifier descriptor in the ROOT directory file, a recording location of a file entry of a directory DIR1 is stored. In a file in the directory DIR1, a plurality of file identifier descriptors are present, each of which stores filenames of FILE1_1 and FILE1_2 and recording locations of their file entries.

The following describes an operation for attempting to acquire a recording location of a target file from the hierarchical structure shown in FIG. 31. Here, it is assumed that the file FILE1_1 is the target file.

Firstly, reference is made to a file set descriptor, from which a location of the file entry of the ROOT directory is acquired.

Next, an allocation descriptor is read from the file entry, so that the location and the length of the extent of the ROOT directory file are obtained, thus reading data of the ROOT directory file. By scanning the thus obtained information on the ROOT directory file, a file identifier descriptor matching "DIR1", which is the directory name of the target, can be detected.

When the file identifier descriptor matching the target directory is detected, then location information on the file entry is obtained from the contents of the file identifier descriptor, while reading the file entry.

Further, an allocation descriptor is read from such a file entry, so that the location and the length of the extent recorded in there are obtained, thus reading data on the directory file.

Then, by scanning the read data of the directory DIR1, a file identifier descriptor matching "FILE1_1", which is a filename of the target, is detected. When the file identifier descriptor matching the target directory is detected, then location information on the file entry is obtained from such a file identifier descriptor, while reading the file entry.

Finally, an allocation descriptor is read from the file entry, so that the location and the length of the extent recorded in there are obtained, thus reading data of the FILE1_1 as the target file.

Next, the following describes an operation where the data recording/reproducing apparatus records data on a disc having a structure according to the UDF file system. The following description deals with a case where FILE1_3 is recorded further under the directory DIR1 with respect to a disc having the partition space shown in FIG. 32.

Firstly, a space bitmap is scanned so that a logical block having a bit value of "1" indicating an unallocated state is obtained. With respect to the unallocated state logical block, data of the FILE1_3 is recorded as an extent. When the recording of the extent is completed, then a file entry indicating the FILE1_3 is recorded with respect to the unallocated logical block.

In this step, location information and a length of the extent indicating the FILE1_3 are recorded in the file entry as allocation descriptors in a required number. In a file of the directory DIR1 as a parent directory of the FILE1_3 a file identifier descriptor indicating the FILE1_3 is recorded.

In this file identifier descriptor, a filename of the FILE1_3 and location information of the file entry are recorded. Then, a bit in the space bitmap corresponding to the sector that was allocated as a result of the above process is set at 0, which indicates an allocated state.

As a result of the above-described process, the logical volume space becomes as shown in FIG. 32. It should be noted that the order of the processing for dealing with the file management information is not limited especially to the above-described example, but a process in the other orders may be carried out.

However, the above-described file management method using the UDF specification has the following problems.

First, according to the UDF specification, a directory is recorded in a partition space as a file, and a file entry also is recorded in the partition space. Therefore, the directory file and file entry might be arranged in a dispersed manner on the disc.

Thus, in the case of attempting to read all files existing under a directory, if a directory file and a file entry are arranged in a dispersed manner, a seek operation with respect to the disc would be generated frequently.

For example, in FIG. 32 also, each of the file entries of FILE1_1, FILE1_2 and FILE1_3 are arranged in a dispersed manner, so that a seek operation is essential for reading these file entries. In such a situation, if a file to be reproduced is a file that requires real time reproduction, such as an AV file, the frequent seek operation would make smooth reproduction difficult.

Similarly, if real time recording is required as in the case of an AV file or the like, when recording the file entry after AV data itself is recorded, a seek operation would be generated with respect to the disc, which interrupts the AV data recording during the seek operation.

In addition, at the time of activating the apparatus, it can be considered that the number of seek operations with respect to the disc can be reduced by performing an on-memory processing by reading all file management information into a memory. However, a lot of seek operations are generated in such a process also, and therefore it would take a long time to activate the apparatus itself. Furthermore, since it is difficult to estimate the required memory capacity in advance, an architecture of a system for arranging computing resources efficiently also becomes difficult.

DISCLOSURE OF THE INVENTION

In order to cope with the above-stated problems, the object of the present invention is to provide a file management method in which a seek operation can be reduced to a minimum even when a UDF file system is used.

To fulfill the above-stated object, a file management method according to the present invention has file management information for managing contiguous blocks on a disc as an extent and for grouping the extent as a file and managing the file, and the file management method includes the steps of: when creating a new directory on the disc, reserving as a reserved area for recording file management information on the file a file or a data area in the directory; and recording information concerning an operation condition of the file management information in the reserved area, in addition to management information on the directory and the file.

With this configuration, there is no need to write file attribute information and a file entry into the disc every time a file is created, and therefore the number of seek operations can be reduced significantly. As a result, AV data as mass data requiring a real time operation can be recorded and reproduced securely.

In the aforementioned file management method of the present invention, it is preferable that, when the file management information recorded in the reserved area is updated, information indicating a fact that the file management information has been updated is recorded in the reserved area. This is because, based on whether the file management information is updated or not, judgment as to whether attribute information needs to be written back can be made easily, and therefore an unnecessary seek operation generated when the information has not been rewritten can be avoided.

In the aforementioned file management method of the present invention, it is preferable that a leading location block and an ending location block of the reserved area on the disc are recorded in the reserved area. This is because a location for writing at the time of starting recording can be specified easily by referring to the leading location block and the ending location block of the reserved area. Therefore, an unnecessary seek operation for searching a writing location can be avoided.

In the aforementioned file management method of the present invention, it is preferable that a leading location block of an area for a file entry in the reserved area and a leading location block of an area for file attribute information in the reserved area are recorded in the reserved area. This is because a location for writing at the time of starting recording can be specified easily by referring to the leading location block of an area for a file entry and the leading location block of an area for file attribute information in the reserved area. Therefore, an unnecessary seek operation can be avoided.

In the aforementioned file management method of the present invention, it is preferable that a time when the file management information is last updated is recorded in the reserved area. This is because writing of an AV file into a medium onto which the AV file should be recorded can be judged easily by recording the last updated date and time in the file management information and making a comparison.

In the aforementioned file management method of the present invention, it is preferable that the reserved area is divided into N areas (N is a natural number no less than 2), at least one of the divided areas is allocated to an area for a file entry, and at least one of the divided areas is allocated to an area for file attribute information. This is because a location for writing at the time of starting recording can be specified easily, and therefore an unnecessary seek operation can be avoided.

Next, to fulfill the above-stated object, another file management method according to the present invention has file management information for managing contiguous blocks on a disc as an extent and for grouping the extent as a file and managing the file, and the file management method includes the steps of: when creating a new directory on the disc, reserving as a reserved area for recording file management information on the file a file or a data area in the directory; and reserving a directory block having a predetermined size in the reserved area for recording a file entry of the directory and a file identifier descriptor of the directory.

With this configuration, the file entry of the directory and the file identifier descriptor of the director can be recorded together in the directory block having the predetermined size. Therefore, a seek operation can be reduced during a procedure such as adding and rewriting a file in a specific directory, so that recording and reproducing of a file requiring a real time property such as an AV file can be conducted easily.

In the aforementioned file management method of the present invention, it is preferable that an area is reserved as a directory block group in a size of an arbitrary integral multiple of a size of the directory block. This is because the directory block group can be used efficiently without waste.

In the aforementioned file management method of the present invention, it is preferable that the size of the directory block group is in the unit of error correction. This is because the smallest unit in rewriting coincides with the unit of error correction, and therefore read-modify-write can be completed in one block, which enables speedy rewriting. Furthermore, even when a disc has to be exchanged because of a defect or the like, the continuity of data can be insured.

In the aforementioned file management method of the present invention, it is preferable that concurrently with the process of reserving the directory block group, an area for recording for a file entry, which corresponds to a required area for recording the file whose file identifier descriptor can be described in the directory, and a part or all of the file is reserved in the reserved area initially and at one time. This is because a seek operation can be reduced further by recording a file entry and file attribute information together as for the file in a specific directory.

In the aforementioned file management method of the present invention, it is preferable that an area is reserved as a directory area in a size of an arbitrary integral multiple of a size of the directory block group. This is because the directory area can be used efficiently without waste and a file entry or the like can be recorded by grouping it according to a predetermined specification, which further can reduce a seek operation.

In the aforementioned file management method of the present invention, it is preferable that concurrently with the process of reserving the directory area, an area for recording for a file entry, which corresponds to a required area for recording the file whose file identifier descriptor can be described in the directory, and a part or all of the file is reserved in the reserved area initially and at one time. This is because a file entry or the like of the file in a specific directory can be recorded at one time, and therefore a seek operation further can be reduced.

In the aforementioned file management method of the present invention, it is preferable that at the same time an area corresponding to the directory block group is reserved beforehand. This is because a new directory block group can be reserved at a predetermined location, and therefore a seek operation further can be reduced.

In the aforementioned file management method of the present invention, it is preferable that when creating a new file, the directory block is created newly at the end of the reserved directory block.

In the aforementioned file management method of the present invention, it is preferable that when, in the reserved directory block group, any one of the area for information concerning the file identifier descriptor in the directory and the reserved area for recording the file entry and the part or all of the file becomes insufficient and when a new file further is created, the directory block is created newly at the end of the reserved directory block, and at the same time an area for recording for a file entry, which corresponds to a required area for recording the file whose file identifier descriptor can be described in the directory, and a part or all of the file is reserved in the reserved area at one time. This is because even when an operation such as adding a new file is performed in the case of the shortage of a sufficient not-registered area for recording, a seek operation can be reduced to a minimum.

In the aforementioned file management method of the present invention, it is preferable that when creating a new file, the directory block group is created newly at the area reserved beforehand as the directory block group. This is because a seek operation can be within a designed range.

In the aforementioned file management method of the present invention, it is preferable that when, in the reserved directory block group, any one of the area for information concerning the file identifier descriptor in the directory and the reserved area for recording the file entry and the part or all of the file becomes insufficient and when a new file further is created, the directory block group is created newly at the area reserved beforehand as the directory block group, and at the same time an area for recording for a file entry, which corresponds to a required area for recording the file whose file identifier descriptor can be described in the directory, and a part or all of the file is reserved in the reserved area at one time. This is because, when a file entry or the like is recorded by classifying it according to a prescribed specification, and even when a sufficient not-registered area for recording is exhausted and a procedure such as adding a new file is conducted, a seek operation can be reduced to a minimum.

In the aforementioned file management method of the present invention, it is preferable that wherein when creating a new file, the directory block group is created newly in the reserved area. This is for using the reserved area effectively.

In the aforementioned file management method of the present invention, it is preferable that when, in the reserved directory block group, any one of the area for information concerning the file identifier descriptor in the directory and the reserved area for recording the file entry and the part or all of the file becomes insufficient, and the area reserved beforehand as the directory block group also becomes insufficient, and when a new file is created, the directory block group is created newly in the reserved area, and at the same time an area for recording for a file entry, which corresponds to a required area for recording the file whose file identifier descriptor can be described in the directory, and a part or all of the file is reserved in the reserved area at one time. This is because a reserved area is used effectively, so that even when there is no sufficient not-registered area for recording and an operation such as adding a new file is conducted, a seek operation can be reduced to a minimum.

In the aforementioned file management method of the present invention, it is preferable that when creating a new file, the reserved area is reserved newly in a space area of the disc, and the directory block group is created in the thus prepared reserved area. This is because, even when there is no space area in the reserved area, the same effects as in utilizing the reserved area can be expected by using the space area of the disc.

In the aforementioned file management method of the present invention, it is preferable that, when, in the reserved directory block group, the area for recording the file identifier descriptor in the directory becomes insufficient, the area reserved beforehand as the directory block become insufficient, and an area for reservation is insufficient in the reserved area that has been reserved initially, and when a new file is created, the reserved area is reserved newly in a space area of the disc, the directory block group is created in the thus prepared reserved area, and at the same time an area for recording for a file entry, which corresponds to a required area for recording the file whose file identifier descriptor can be described in the directory, and a part or all of the file is reserved in the thus prepared reserved area at one time. This is because, even when there is no space area in the reserved area, and when there is no sufficient not-registered area for recording and a procedure such as adding a new file is conducted, a seek operation can be reduced to a minimum by utilizing the space area of the disc.

Next, to fulfill the above-stated object, a data recording apparatus, a data reproducing apparatus, and a data recording/reproducing apparatus according to the present invention record and reproduce data by the above-described file management methods.

With this configuration, there is no need to write file attribute information and a file entry onto a disc every time a file is created, and therefore the number of seek operations can be decreased significantly. As a result, a data recording apparatus, a data reproduction apparatus, and a data recording/reproducing apparatus by which AV data can be recorded and reproduced as mass data requiring the real time reproduction can be realized.

BRIEF DESCRIPTION OF DRAWINGS

FIG. 3 shows an example of a structure of the initial partition space in the file management method according to Embodiment 1 of the present invention.

FIG. 4A shows an example of a structure of a recording area of file management information in the file management method according to Embodiment 1 of the present invention, and FIG. 4B shows an example of a structure of a block map in the recording area of the file management information in the file management method according to Embodiment 1 of the present invention

FIG. 7 shows an example of a structure of the partition space after an AV file is recorded in the file management method according to Embodiment 1 of the present invention.

FIG. 8 shows an example of a structure of the initial partition space in the file management method according to Embodiment 6 of the present invention.

FIG. 9A shows an example of a structure of a recording area of file management information in the file management method according to Embodiment 6 of the present invention, and FIG. 9B shows an example of a structure of a block map in the recording area of the file management information in the file management method according to Embodiment 6 of the present invention.

FIG. 10 shows an example of a structure of the partition space after an AV file is recorded in the file management method according to Embodiment 6 of the present invention.

FIG. 12 shows an example of a structure of the initial partition space in the file management method according to Embodiment 7 of the present invention.

FIG. 14 shows a structure of the initial partition space in the file management method according to Embodiment 9 of the present invention.

FIG. 15 shows a structure of the initial partition space in the file management method according to Embodiment 10 of the present invention.

FIG. 16 shows a structure of the initial partition space in the file management method according to Embodiment 12 of the present invention.

FIG. 17 shows a structure of the initial partition space in the file management method according to Embodiment 13 of the present invention.

FIG. 18 shows a structure of the partition space after recording in the file management method according to Embodiment 13 of the present invention.

FIG. 19 shows a structure of the initial partition space in the file management method according to Embodiment 14 of the present invention.

FIG. 20 shows a structure of the partition space after recording in the file management method according to Embodiment 14 of the present invention.

FIG. 21 shows a structure of the initial partition space in the file management method according to Embodiment 15 of the present invention.

FIG. 22 shows a structure of the partition space after recording in the file management method according to Embodiment 15 of the present invention.

FIG. 25 shows an example of the partition space in the data recording/reproducing apparatus using the conventional file management method.

FIG. 27 shows an example of a file entry in the data recording/reproducing apparatus using the conventional file management method.

FIG. 28 shows an example of an allocation descriptor in the data recording/reproducing apparatus using the conventional file management method.

FIG. 29 shows interpretations and explanations of the extent length in the data recording/reproducing apparatus using the conventional file management method.

FIG. 30 shows an example of a structure of the directory file in the data recording/reproducing apparatus using the conventional file management method.

FIG. 32 shows an example of a structure of the partition space after recording in the data recording/reproducing apparatus using the conventional file management method.

BEST MODE FOR CARRYING OUT THE INVENTION

The following describes a file management method according to embodiments of the present invention, with reference to the drawings. Hereinafter, a file containing audio data and visual data compressed according to the MPEG method or the like will be referred to as an AV file. In addition, in this specification, a disc means a general recording medium having a disc-shape, including an optical disc such as DVD-RAM, MO, DVD-R, DVD-RW and DVD+RW, and a hard disc.

Embodiment 1

Figure 1:
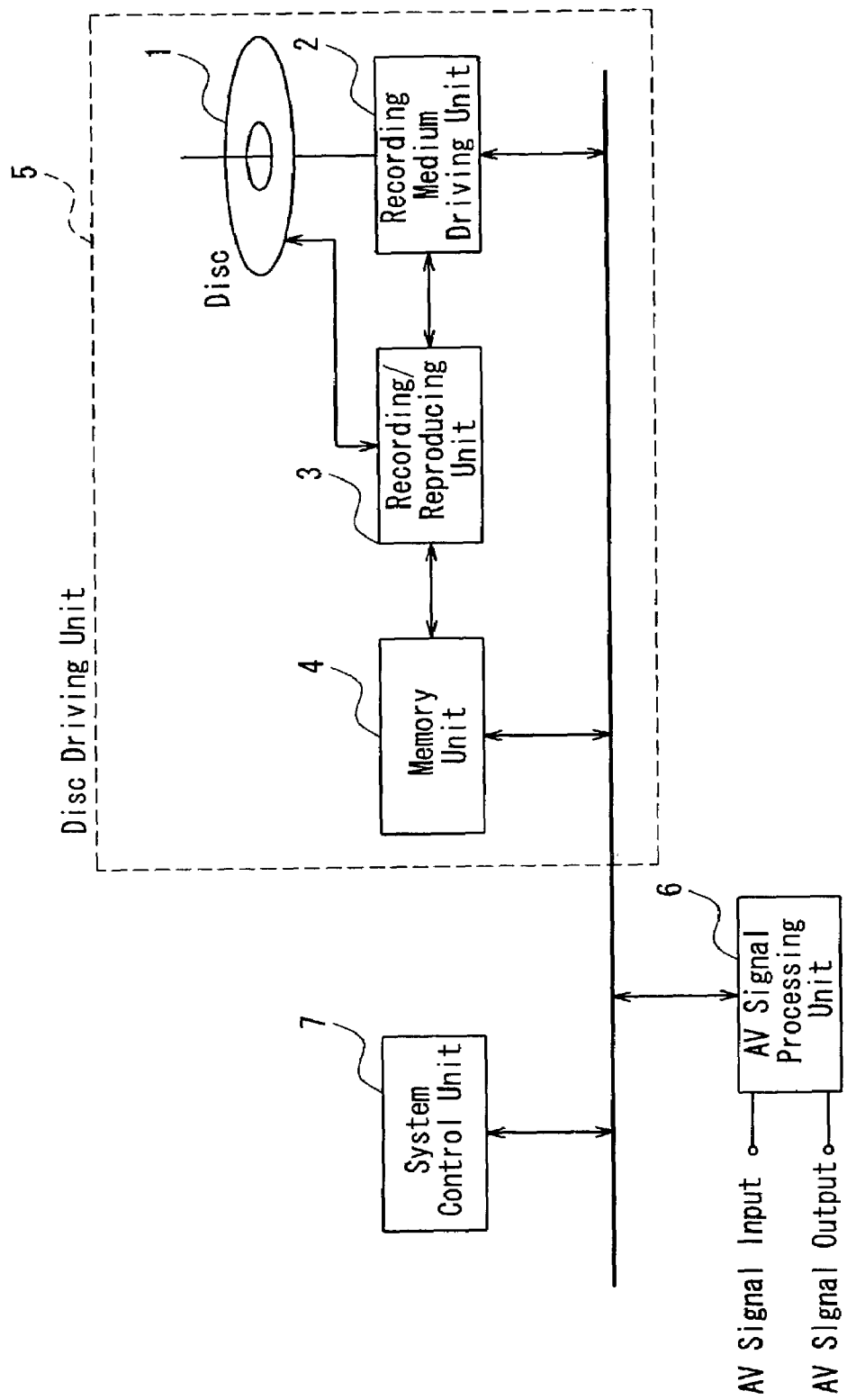
FIG. 1 shows a configuration example of a data recording/reproducing apparatus using a file management method according to Embodiment 1 of the present invention.

First, FIG. 1 shows a configuration example of a data recording/reproducing apparatus to which a file management method according to Embodiment 1 of the present invention is applied. Numeral 1 denotes a disc such as optical magnetic disc, and numeral 2 denotes a recording medium driving unit, respectively. In the case of the disc 1 being an optical magnetic disc, the recording medium driving unit 2 is composed of a spindle motor and the like.

Numeral 3 denotes a recording/reproducing unit, and in the case of the disc 1 being an optical magnetic disc, this unit is composed of an optical pickup, a magnetic head, a servo circuit, a modulation demodulation circuit and the like.

In addition, numeral 4 denotes a memory unit, which stores data temporarily at the time of recording/reproducing data. Numeral 5 denotes a disc driving unit, and is composed of the disc 1, the recording medium driving unit 2, the recording/reproducing unit 3 and the memory unit 4.

Further, numeral 6 denotes an AV signal processing unit, which carries out processing such as MPEG compression with respect to an AV input signal input from a CCD camera or the like, and MPEG decompression with respect to AV data read from a disc medium to output to a monitor or the like. Numeral 7 denotes a system control unit, which controls the AV signal processing unit 6 and the disc driving unit 5.

In the data recording/reproducing apparatus constructed in this way, at the time of recording data, an AV signal input into the AV signal processing unit 6 is subjected to image compression processing according to the MPEG method or the like, and then is transferred to the memory unit 4 in the control of the system control unit 7. Next, the recording medium driving unit 2 and the recording/reproducing unit 3 operate in the control of the system control unit 7 so that the data in the memory unit 4 is recorded on the disc 1.

At the time of reproducing data, the recording medium driving unit 2 and the recording/reproducing unit 3 operate in the control of the system control unit 7 so that data recorded in the disc 1 is transferred to the memory unit 4. Next, in the control of the system control unit 7, the data is read from the memory unit 4 and the AV signal processing unit 6 outputs the data as an AV signal.

Figure 2:
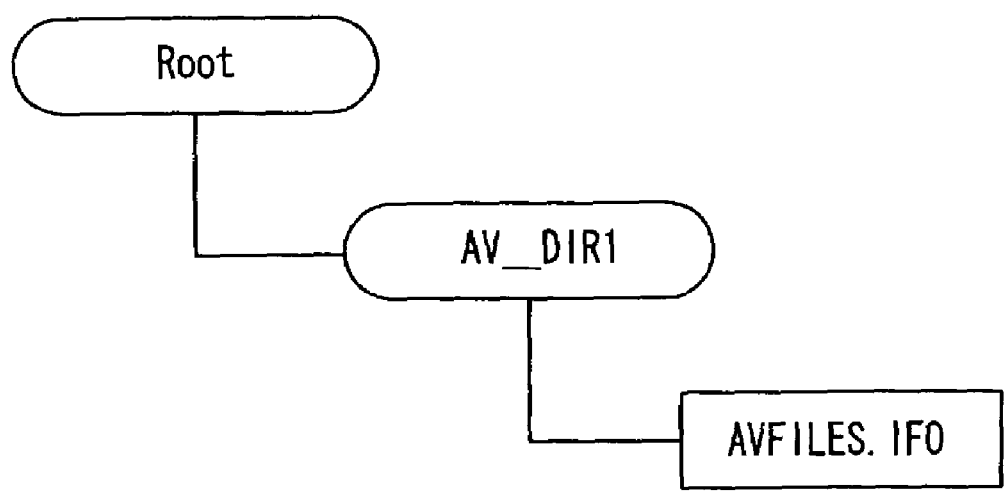
FIG. 2 shows an example of a structure of the initial directory in the file management method according to Embodiment 1 of the present invention.

FIG. 2 shows an example of a file/directory structure immediately after a directory is formed for recording an AV file in the file management method according to Embodiment 1. In FIG. 2, ROOT surrounded by an oval indicates a root directory, and AV_DIR1 indicates a directory for recording an AV file therein, respectively. AVFILES.IFO surrounded by a rectangle indicates a management file created in the directory AV_DIR1.

FIG. 3 shows an example of a data structure of the partition space in a state where the file/directory structure shown in FIG. 2 is recorded on the disc 1 used in the data recording/reproducing apparatus to which the file management method according to Embodiment 1 of the present invention is applied. In FIG. 3, at LBN=0 to 79, a space bitmap descriptor is recorded. Since LBN=251 or later becomes an "unallocated state", each bit corresponding to these sectors is set at "1".

In addition, at LBN=80, a file set descriptor is recorded. It should be noted that if the file entry is a file entry of the root directory, location information on such a file entry is recorded in the file set descriptor. At LBN=81, a terminating descriptor is recorded.

Further, at LBN=82, a file entry of the ROOT directory is recorded, at LBN=83, a file identifier descriptor of the ROOT directory as a parent directory and a file identifier descriptor of the directory AV_DIR1 are recorded, and at LBN=84, a file entry of the directory AV_DIR1 is recorded, respectively.

Next, at LBN=85, a file identifier descriptor of the directory AV_DIR1 as a parent directory and a file identifier descriptor of the AVFILES.IFO file are recorded. At LBN=86, a file entry of the AVFILES.IFO file is recorded. At LBN=87, a management area of the AVFILES.IFO is recorded.

The management area of the AVFILES.IFO has a configuration shown in FIG. 4A, where a block map shown in FIG. 4B is recorded. Here, the block map is a map for managing an operation condition of each LBN at LBN=88 to 250. The LBN=88 to 250 is an extent of the AVFILES.IFO file, where the value of the upper 2 bits of the allocation descriptor is set so that the extent becomes "allocated" and "not recorded".

Therefore, in the operation of the conventional file system, data cannot be written at LBN=87 to 250. Hereinafter, this extent of the AVFILES.IFO file will be called an AV reserved area. Since LBN=0 to 250 are in a state of "allocated" as described above, a corresponding bit in the space bitmap is set at "0".

Figure 5:
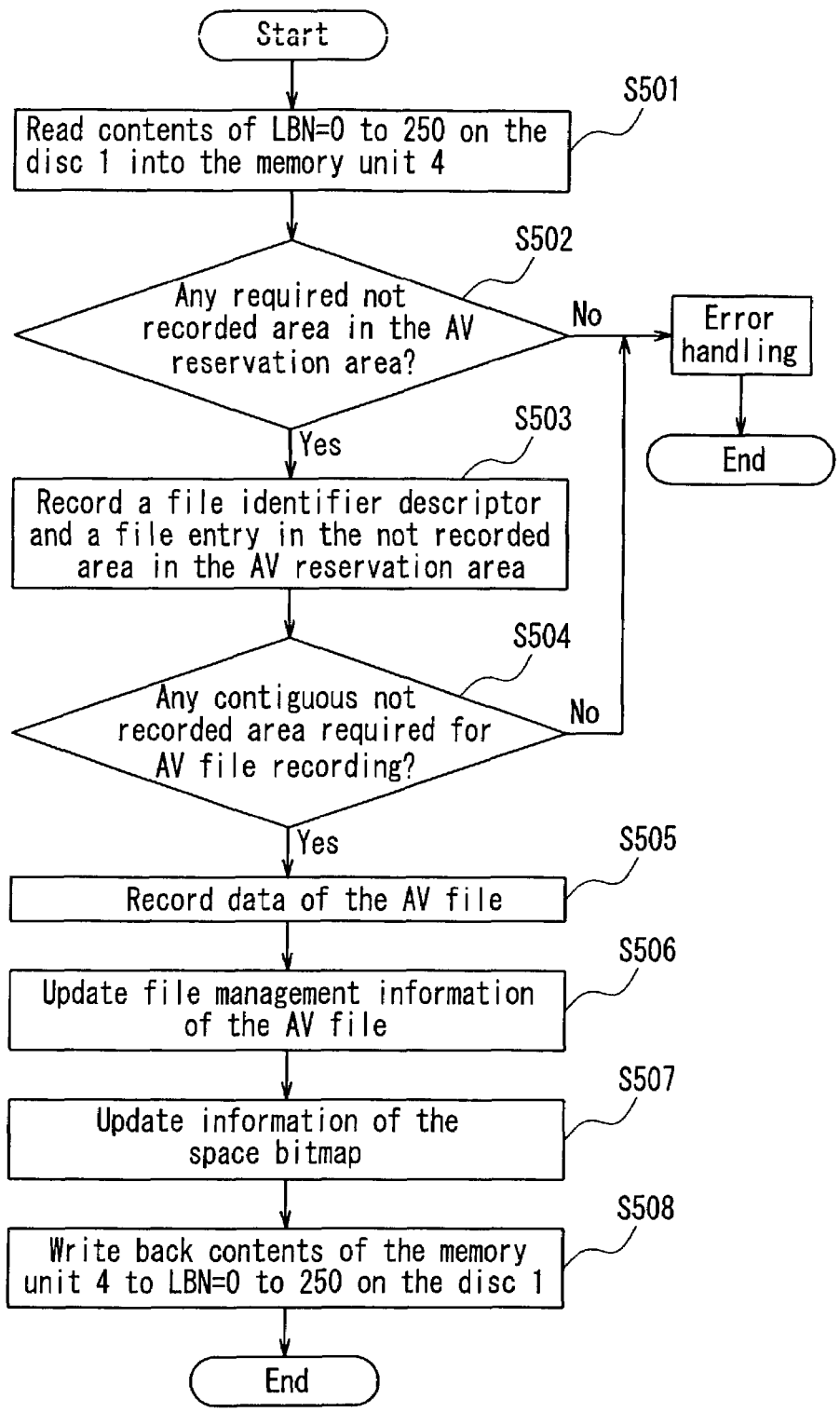
FIG. 5 is a flowchart showing a procedure for recording an AV file in the file management method according to Embodiment 1 of the present invention.

When recording an AV file on a disc in such a state, a procedure in a flowchart shown in FIG. 5 is carried out. After commencing recording of the AV file according to a user's instruction or the like, as the first step in FIG. 5, contents of LBN=0 to 250 on the disc 1 are read into the memory unit 4 (Step S501). Next, by scanning information of the AV reserved area on the memory unit 4, the presence or absence of a not recorded area required for newly recording file attribute information and a file entry is judged (Step S502). If judged as the absence of a sufficient not recorded area for newly recording (Step S502: No), then error handling is carried out and the AV file recording process is completed. If judged as the presence of a sufficient not-recording area, the file attribute information and the file entry are recorded in the not recorded area in the AV reserved area on the memory unit 4 (Step S503).

In this step, the recording of the file attribute information and the file entry changes the size of the extent of the directory AV_DIR1 and the size of the AVFILES.IFO file. Therefore, based on such a change, an allocation descriptor of the file entry of the directory AV_DIR1 and the file entry of the AVFILES.IFO file are rewritten.

Next, by scanning the space bitmap on the memory unit 4, the presence or absence of unrecorded contiguous logical blocks and in a number required for recording the AV file is judged (Step S504). If judged as the absence of the contiguous unrecorded logical blocks and in the required number (Step S504: No), then error handling is carried out and the AV file recording process is completed. If judged as the presence, data is recorded with respect to the logical blocks on the disc, which correspond to the not recorded area obtained in the Step S504 (Step S505).

When the recording of the AV file data is completed, information concerning the location and the length of the extent of the AV file is recorded in the allocation descriptor in the file entry on the memory unit 4, which was created in Step S503, so as to update the file management information of the AV file (Step S506). Also, required information such as a filename and a file creation time is updated with respect to the file attribute information and the file entry, in addition to the allocation descriptor. At the same time, the contents of the block map in the AVFILES.IFO file are rewritten based on such a change.

Next, the bits of the space bitmap on the memory unit 4 corresponding to the logical blocks onto which data was recorded in Step S504 are changed to "0" that represents an "allocated" state (Step S507). Then, the contents of the memory unit 4 are written back to the location at LBN=0 to 250 (Step S508). In this way, the file is recorded, which means that the AV file is recorded under the directory AV_DIR1.

Figure 6:
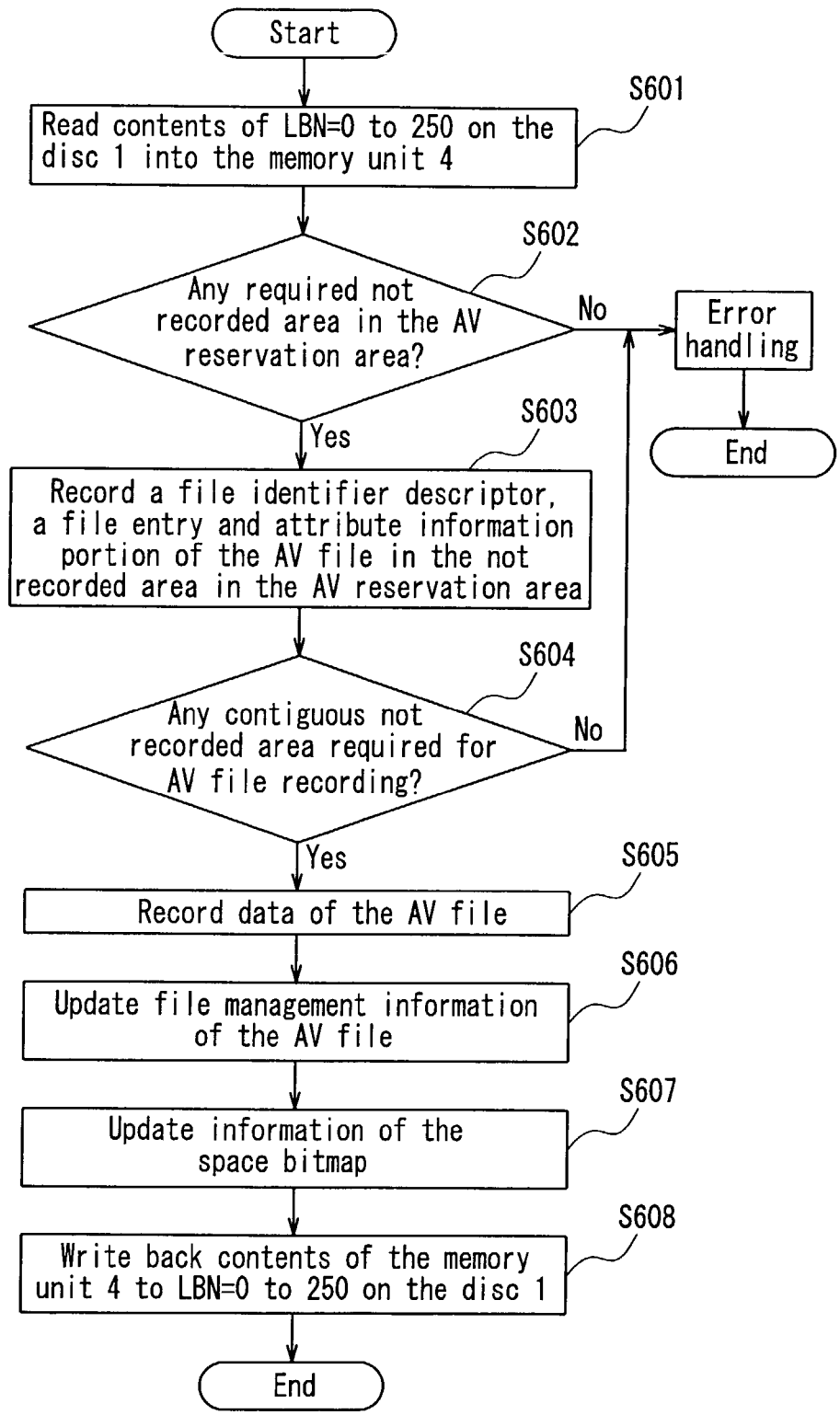
FIG. 6 is another flowchart showing a procedure for recording an AV file in the file management method according to Embodiment 1 of the present invention.

In the case of attempting to record a plurality of AV files sequentially, after Step S601 in a flowchart shown in FIG. 6, Step S602 through step S607 may be repeated until all of the AV files have been recorded, and after all of the AV files have been recorded, the procedure may go to Step S608. In this case also, in Step S605 where the file entry and the file attribute information in the extent of the AVFILES.IFO file are added, judgment as to whether the area has been used already or not is carried out by utilizing the block map in the AVFILES.IFO file.

As stated above, according to Embodiment 1, there is no need to write file attribute information and a file entry onto a disc every time a file is created, and therefore the number of seek operations can be decreased significantly. As a result, AV data as mass data requiring the real time reproduction can be recorded and reproduced.

After FILE1.DAT and FILE2.DAT as AV files are recorded under the directory AV_DIR1 in accordance with the procedure shown in the flowchart in FIG. 5, a data structure of the partition space becomes as shown in FIG. 7.

In FIG. 7, among the AV reserved areas, a logical block with a larger LBN is used for recording a new file entry. Meanwhile, file attribute information is recorded so as to be appended to the "allocated" and "not recorded" extent of the AVFILES.IFO as a management file.

Since file identifier descriptors and file entries both have a variable length data structure, it is preferable that file identifier descriptors are recorded at LBN with a smaller number in the AV reserved area, while file entries are recorded at LBN with a larger number as described above.

This is because, when adding a file entry and file attribute information into the extent of the AVFILES.IFO file, judgment concerning a space area can be carried out easily by referring to the block map in the AVFILES.IFO file.

It should be noted that the recording procedure is not limited to the procedure shown in FIG. 5, but the following procedure may be conducted: that is, as described in International Publication No. WO98/14938 as one example, a plurality of contiguous space areas are reserved prior to actual data recording and are registered as an "allocated state" in the space bitmap, and then actual data recording is started.

In addition, the allocation descriptor of the directory AV_DIR1 and the information on the space bitmap may be updated at one time after the recording of file data is completed.

A procedure for making the data structure in the partition space of the disc the initial state shown in FIG. 3 is carried out when necessary, prior to the recording of the AV file.

The name of the directory/file into which the AV file is recorded is not limited to that stated in Embodiment 1, but other directory/file names also are acceptable.

In this embodiment, contents of LBN=0 to 250 are read into the memory unit 4 at the time of recording and reproducing. However, there is no need to keep all information in the memory unit 4, but only information necessary for the recording/reproducing operation is kept, and only information that needs to be updated may be written back to the disc 1.

In this embodiment, LBN=87 to 250 is made the "allocated" and "not recorded" extent of the AVFILES.IFO file as the AV reserved area, but the recording location and capacity of the AV reserved area are not limited to LBN=0 to 250. Insofar as reserving a contiguous area on the disc, other recording locations and capacities also are acceptable.

Embodiment 2

The following describes a file management method according to Embodiment 2 of the present invention, with reference to the drawings. In the above-stated Embodiment 1, a block map is recorded in a management area of the AVFILES.IFO file. On the other hand, Embodiment 2 has a feature in that a changed-state indication flag concerning all attribute information including a reserved area is recorded, in addition to the block map.

That is, at LBN=87, a management area of the AVFILES.IFO file is recorded. The management area of the AVFILES.IFO has a configuration shown in FIG. 4A, onto which a changed-state indication flag concerning all attribute information including the reserved area is recorded. Note here that the changed-state indication flag indicates whether any one of LBN=87 to 250 is rewritten or not.

A basic procedure for recording an AV file on a disc using the changed-state indication flag concerning all attribute information including a reserved area is similar to the procedure shown in FIG. 5. However, the bits of the space bitmap on the memory unit 4 corresponding to the logical blocks onto which data was recorded in Step S504 are changed to "0", which represents "allocated" (Step S507), and at the same time the changed-state indication flag in the AVFILES.IFO file also is changed because the attribute information is rewritten.

Then, when confirming the contents of the changed-state indication flag in the AVFILES.IFO file, if the flag indicates that the attribute information is rewritten, then the contents of the memory unit 4 are written back to the location at LBN=0 to 250 on the disc 1. If the attribute information is not rewritten, a procedure of writing back is not carried out (Step S508). In this way, the file is recorded, which means that the AV file is recorded under the directory AV_DIR1.

In the case of attempting to record a plurality of AV files sequentially, after Step S601 in the flowchart shown in FIG. 6, Step S602 through step S607 may be repeated until all of the AV files have been recorded, and after all of the AV files have been recorded, the procedure may go to Step S608. In this case also, in Step S608, the contents of the changed-state indication flag are confirmed and if the flag indicates that the attribute information is rewritten, then the contents of the memory unit 4 are written back to the location at LBN=0 to 250 on the disc 1. If the attribute information is not rewritten, a procedure for writing back is not carried out.

As stated above, according to Embodiment 2, judgment as to whether the attribute information needs to be written back or not can be carried out easily on the basis of the changed-state indication flag in the AVFILES.IFO file. Therefore, an unnecessary seek operation generated when the information is not rewritten can be avoided.

Embodiment 3

The following describes a file management method according to Embodiment 3 of the present invention, with reference to the drawings. In Embodiment 1, a block map is recorded in a management area of the AVFILES.IFO file. On the other hand, Embodiment 3 has a feature in that a starting LBN and an ending LBN of a reserved area are recorded in addition to the block map.

That is, at LBN=87, a management area of the AVFILES.IFO file is recorded. The management area of the AVFILES.IFO file has a configuration shown in FIG. 4A, and the starting LBN and the ending LBN of the reserved area are recorded. Note here that, in the case of Embodiment 3, the starting LBN and the ending LBN of the reserved area correspond to a starting LBN=87 of the reserved area and an ending LBN=250 of the reserved area, respectively.

A basic procedure for recording an AV file on a disc using the starting LBN and the ending LBN of the reserved area is similar to the procedure shown in the flowchart in FIG. 5.

When file attribute information and a file entry are recorded in the not recorded area in the AV reserved area on the memory unit 4 (Step S503), the file attribute information is recorded from LBN=87 by referring to the starting LBN in the management area of the AVFILES.IFO and similarly the file entry is recorded from LBN=250 by referring to the ending LBN of the reserved area.

When all the procedure is completed, the contents of the memory unit 4 are written back to the location at LBN=0 to 250 on the disc 1. In this way, the file is recorded, which means that the AV file is recorded under the directory AV_DIR1.

As described above, according to Embodiment 3, a location for writing at the time of starting recording can be specified easily by referring to the starting LBN and the ending LBN of the reserved area. Therefore, an unnecessary seek operation for searching a writing location can be avoided.

Embodiment 4

The following describes a file management method according to Embodiment 4 of the present invention, with reference to the drawings. In Embodiment 1, a block map is recorded in a management area of the AVFILES.IFO file. On the other hand, Embodiment 4 has a feature in that a leading location LBN of a file entry area and a leading location LBN of a file attribute information area are recorded in addition to the block map.

That is, at LBN=87, a management area of the AVFILES.IFO file is recorded. The management area of the AVFILES.IFO file has a configuration shown in FIG. 4A, and the leading location LBN of the file entry area and the leading location LBN of the file attribute information area are recorded. Note here that, in the case of Embodiment 4, the leading location LBN of the file entry area and the leading location LBN of the file attribute information area correspond to a leading location LBN=250 of the file entry area and a leading location LBN=87 of the file attribute information area, respectively.

A basic procedure for recording an AV file on a disc using the leading location LBN of the file entry area and the leading location LBN of the file attribute information area is similar to the procedure shown in the flowchart in FIG. 5.

When file attribute information and a file entry are recorded in the not recorded area in the AV reserved area on the memory unit 4 (Step S503), the file entry is recorded from LBN=250 by referring to the leading location LBN of the file entry area in the management area of the AVFILES.IFO, and similarly the file attribute information is recorded from LBN=87 by referring to the leading location LBN of the file attribute information area.

Then, the bits of the space bitmap on the memory unit 4 corresponding to the logical blocks onto which data was recorded in Step S504 are changed to "0" that represents "allocated" (Step S507).

When all the procedure is completed, the contents of the memory unit 4 are written back to the location at LBN=0 to 250 on the disc 1. In this way, the file is recorded, which means that the AV file is recorded under the directory AV_DIR1.

As described above, according to Embodiment 4, a location for writing at the time of starting recording can be specified easily by referring to the leading location LBN of the file entry area and the leading location LBN of the file attribute information area. Therefore, an unnecessary seek operation can be avoided.

Embodiment 5

The following describes a file management method according to Embodiment 5 of the present invention, with reference to the drawings. In Embodiment 1, a block map is recorded in a management area of the AVFILES.IFO file. On the other hand, Embodiment 5 has a feature in that a last updated date and time are recorded in addition to the block map.

That is, at LBN=87, a management area of the AVFILES.IFO file is recorded. The management area of the AVFILES.IFO file has a configuration shown in FIG. 4A, and the last updated date and time are recorded. Note here that the last updated date and time are the date and time when the AVFILES.IFO file is rewritten.

A basic procedure for recording an AV file on a disc using the last updated date and time is similar to the procedure shown in the flowchart in FIG. 5.

When file attribute information and a file entry are recorded in the not recorded area in the AV reserved area on the memory unit 4 (Step S503), the recording of the file attribute information and the file entry changes the size of the extent of the directory AV_DIR1 and the size of the AVFILES.IFO file. Therefore, based on such a change, an allocation descriptor of the file entry of the directory AV_DIR1 and the file entry of the AVFILES.IFO file are rewritten.

Also, required information such as a filename and a file creation time is updated with respect to the file attribute information and the file entry, in addition to the allocation descriptor. At the same time, the last updated date and time in the AVFILES.IFO file are updated to the latest date and time to be recorded.

When all the procedure is completed, the contents of the memory unit 4 are written back to the location at LBN=0 to 250 on the disc 1. In this way, the file is recorded, which means that the AV file is recorded under the directory AV_DIR1.

Inherently, recording of an AV file is followed by rewriting of a management area of the AVFILES.IFO file. Therefore, the last updated information provided in the file entry of each recorded AV file and the last updated date and time in the AVFILES.IFO file always agree with each other.

However, in the case where a file is written with another recording apparatus by a method different from Embodiment 5, rewriting of the management area of the AVFILES.IFO file is not generated. In this case, since the last updated information provided in each of the file entries and the last updated date and time in the AVFILES.IFO file do not agree with each other, it can be found that a procedure other than the recording of an AV file is carried out.

As stated above, according to Embodiment 5, writing of an AV file into a medium onto which the AV file should be recorded can be judged easily by recording the last updated date and time in the management area of the AVFILES.IFO file and making a comparison. Therefore, an unnecessary seek operation can be avoided at the time of recording an AV file.

Embodiment 6

The following describes a file management method according to Embodiment 6 of the present invention, with reference to the drawings. In Embodiment 1, a block map is recorded in a management area of the AVFILES.IFO file. On the other hand, Embodiment 6 has a feature in that, in addition to the foregoing, the management area is divided into plural areas, at least one of the divided management areas is allocated to record a file entry, and at least one of them is allocated to record a file attribute information.

FIG. 8 shows an example of a data structure in the initial partition space of a disc used in a data recording/reproducing apparatus to which a file management method according to Embodiment 6 of the present invention is applied. In FIG. 8, at LBN=0 to 79, a space bitmap descriptor is recorded. Since LBN=251 or later becomes an "unallocated state", each bit corresponding to these sectors is set at "1".

As shown in FIG. 8, a not recorded area in the AV reserved area at LBN=88 to 250 is divided into two areas of LBN=88 to 169 and LBN=170 to 250. Then, these two areas are allocated as a file entry area and a file attribute information area, respectively.

At LBN=87, the management area of the AVFILES.IFO file is recorded. The management area of the AVFILES.IFO file has a configuration shown in FIGS. 9A and 9B, and a leading location LBN of the allocated file entry area and a leading location LBN of the allocated file attribute information area are recorded. Note here that, in Embodiment 6, the leading location LBN of the file entry area and the leading location LBN of the file attribute information area correspond to the leading location LBN=170 of the file entry area and the leading location LBN=87 of the file attribute information area, respectively.

When recording an AV file on a disc in such a state, the procedure shown in the flowchart of FIG. 5 is carried out. First, contents of LBN=0 to 250 on the disc 1 are read into the memory unit 4 (Step S501). Next, by scanning information of the AV reserved area on the memory unit 4, the presence or absence of a not recorded area required for newly recording file attribute information and a file entry is judged (Step S502). If judged as the absence of a sufficient not recorded area for newly recording (Step S502: No), then error handling is carried out and the AV file recording process is completed. If judged as the presence of a sufficient not-recording area, the file attribute information and the file entry are recorded in the not recorded area in the AV reserved area on the memory unit 4 (Step S503).

In this step, the file entry is recorded from LBN=170 by referring to the leading location LBN of the file entry area in the management area of the AVFILES.IFO and similarly the file attribute information is recorded from LBN=87 by referring to the leading location LBN of the file attribute information area.

In this step, the recording of the file attribute information and the file entry changes the size of the extent of the directory AV_DIR1 and the size of the AVFILES.IFO file. Therefore, based on such a change, an allocation descriptor of the file entry of the directory AV_DIR1 and the file entry of the AVFILES.IFO file are rewritten.

Next, by scanning the space bitmap on the memory unit 4, the presence or absence of contiguous unrecorded logical blocks and in a number required for recording the AV file is judged (Step S504). If judged as the absence of contiguous unrecorded logical blocks and in the required number (Step S504: No), then error handling is carried out and the AV file recording process is completed. If judged as the presence, data is recorded with respect to the logical blocks on the disc, which correspond to the not recorded area obtained in the Step S504 (Step S505).

When the recording of the AV file data is completed, information concerning the location and the length of the extent of the AV file is recorded in the allocation descriptor in the file entry on the memory unit 4, which was created in Step S503, so as to update the file management information of the AV file (Step S506).

Next, the bits of the space bitmap on the memory unit 4 corresponding to the logical blocks onto which data was recorded in Step S504 are changed to "0", which represents an "allocated" state (Step S507). Then, contents of the memory unit 4 are written back to the location at LBN=0 to 250 (Step S508). In this way, the file is recorded, which means that the AV file is recorded under the directory AV_DIR1. The partition space after recording of the AV file becomes a structure shown in FIG. 10.

As stated above, according to Embodiment 6, the management area is divided into plural areas, at least one of the divided management areas is allocated to a file entry, and at least one of them is allocated to a file attribute information. Thereby, a location for writing at the time of starting recording can be judged easily, so that an unnecessary seek operation can be avoided at the time of recording an AV file.

Embodiment 7

The following describes a file management method according to Embodiment 7 of the present invention, with reference to the drawings. A configuration example of a data recording/reproducing apparatus to which the file management method according to Embodiment 7 of the present invention is applied is illustrated in FIG. 1, as in the case with Embodiment 1. Operations of recording and reproducing data also are similar to Embodiment 1.

Figure 11:
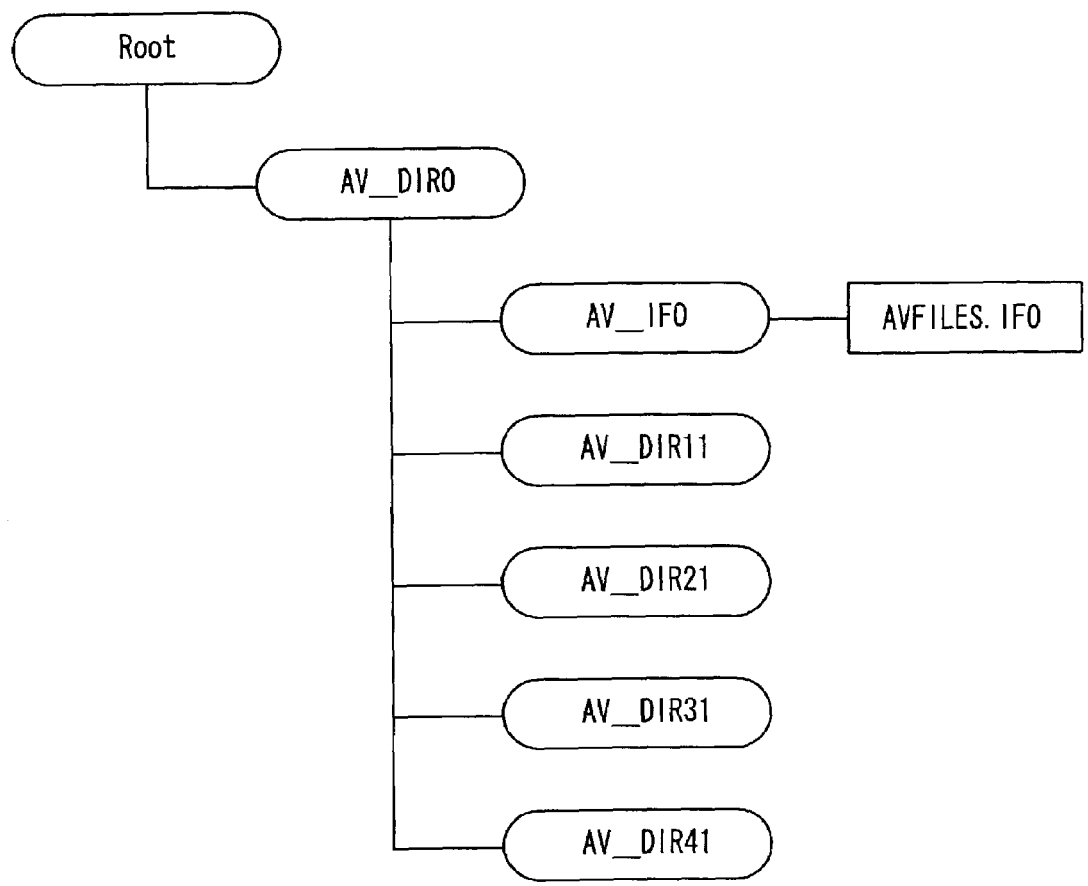
FIG. 11 shows an example of a structure of the initial directory in the file management method according to Embodiment 7 of the present invention.

FIG. 11 shows an example of a file/directory structure immediately after creating a directory for recording an AV file in the file management method according to Embodiment 7. In FIG. 11, ROOT surrounded by an oval denotes a root directory, AV_DIR11, AV_DIR21, AV_DIR31 and AV_DIR41 denote directories for recording an AV file therein, and AVFILES.IFO denotes a management file created in the directory AV_IFO.

FIG. 12 shows a data structure in the partition space in a state where the file/directory structure shown in FIG. 11 is recorded on a disc to which the file management method according to Embodiment 7 is applied.

In FIG. 12, at LBN=0 to 93, a space bitmap descriptor is recorded. As described later, since LBN=384+A*4+1 or later becomes an unallocated state, each bit corresponding to these sectors is set at "1".

At LBN=94, a file set descriptor is recorded. In the case of a file entry of the root directory, its location information is recorded in the file set descriptor.

At LBN=95, a terminating descriptor is recorded. At LBN=96, the file entry of the ROOT directory is recorded.

At LBN=97 to 127, a file identifier descriptor of the ROOT directory as a parent directory and a file identifier descriptor of the directory AV_DIR1 are recorded.

At LBN=128, a file entry of the directory AV_DIR1 is recorded. At LBN=129 to 159, a file identifier descriptor of the directory AV_DIR1 as a parent directory and a file identifier descriptor of each of the directories including AV_IFO, AV_DIR11, AV_DIR21, AV_DIR31 and AV_DIR41 are recorded.

At LBN=160, a file entry of the directory AV_IFO is recorded. At LBN=161 to 191, a file identifier descriptor of the directory AV_IFO as a parent directory and a file identifier descriptor of the file AVFILES.IFO are recorded.

At LBN=192, a file entry of the file AVFILES.IFO is recorded. At LBN=193 to 223, the file AVFILES.IFO is recorded.

At LBN=224, a file entry of the directory AV_DIR11 is recorded. At LBN=225 to 231, a file identifier descriptor of the directory AV_DIR11 as a parent directory is recorded. Hereinafter, LBN=224 to 231 will be made a directory block of the directory AV_DIR11.

At LBN=232 to 255, an extent of the file AVFILES.IFO is recorded. As for this extent, the value of the upper 2 bits of the allocation descriptor is set so that the extent becomes "allocated" and "not recorded". Therefore, in the operation of the conventional file system, data cannot be written at LBN=232 to 255.

Figure 13:
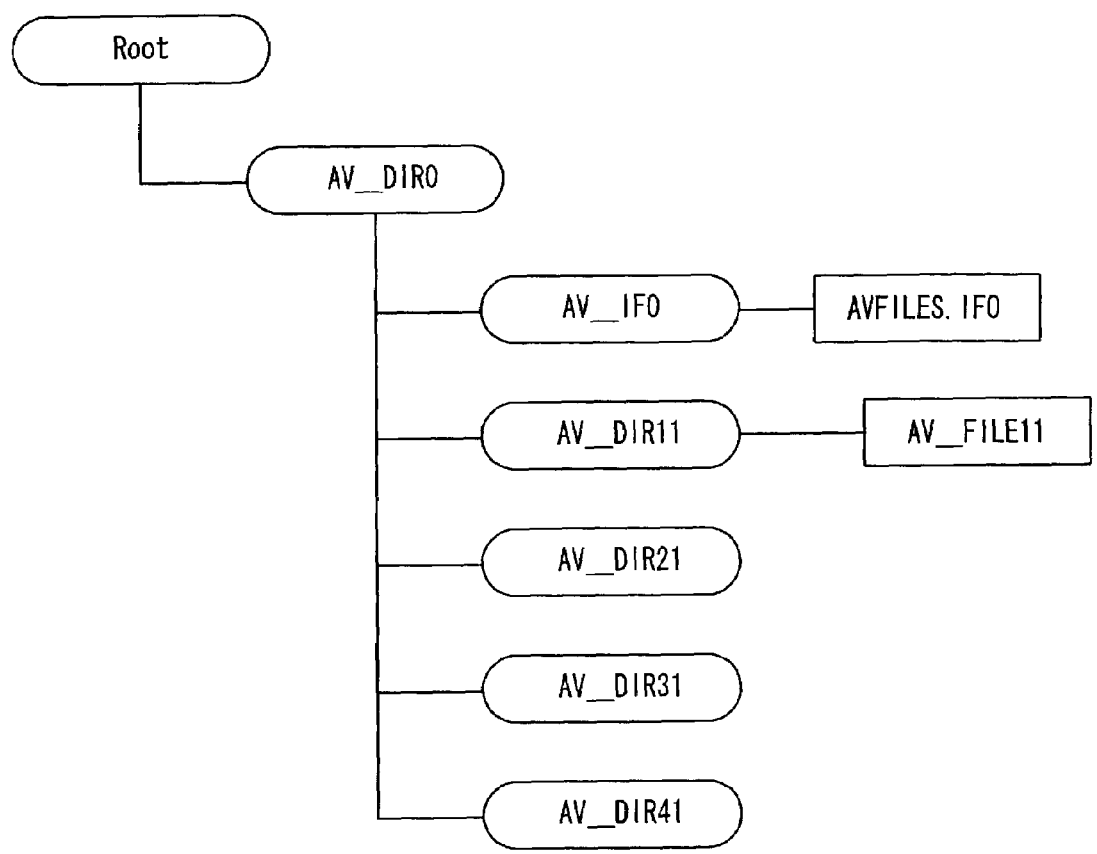
FIG. 13 shows an example of a structure of the directory in the file management method according to Embodiment 7 of the present invention.
Figure 23:
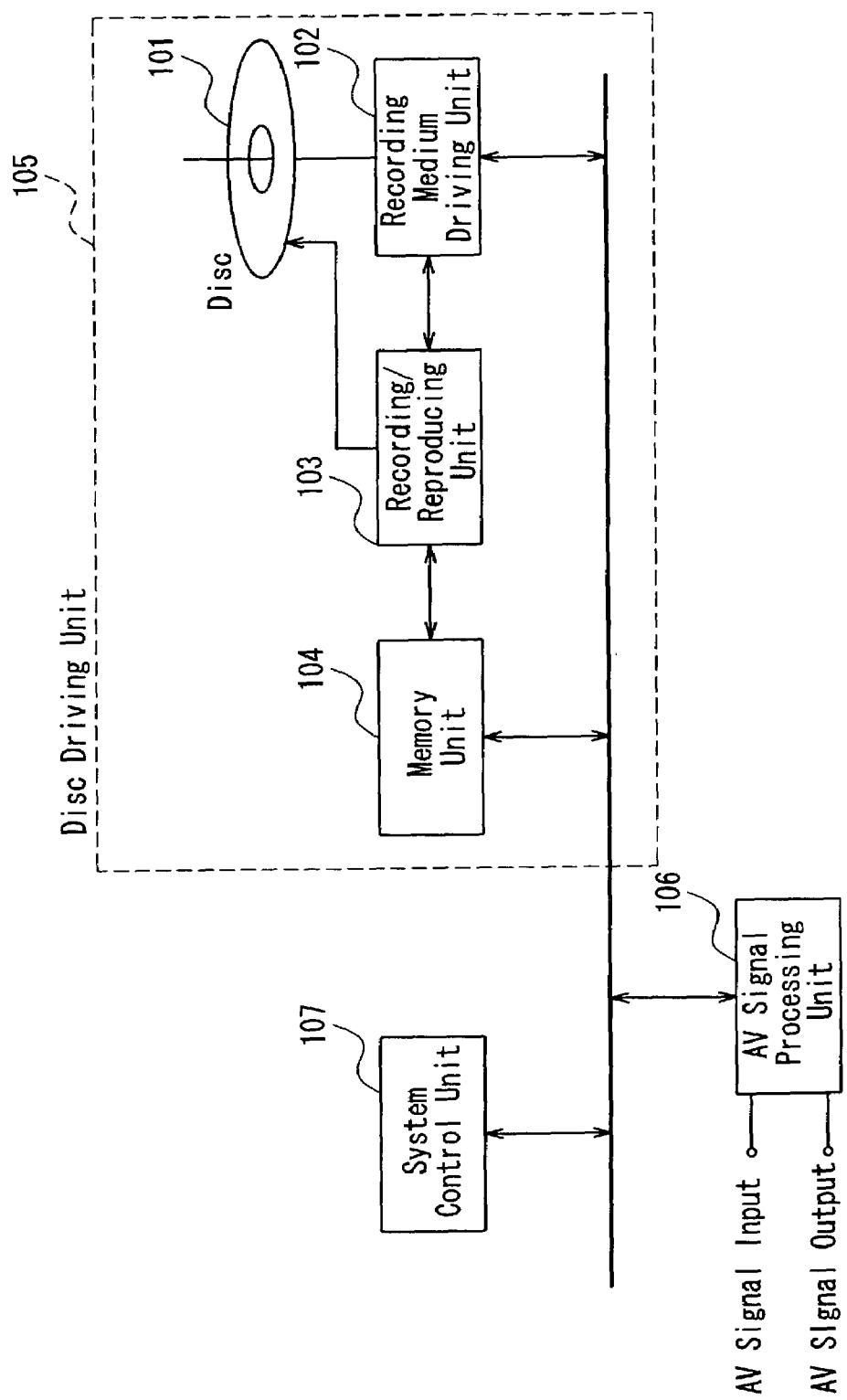
FIG. 23 shows a configuration example of a data recording/reproducing apparatus using the conventional file management method.
Figure 24:
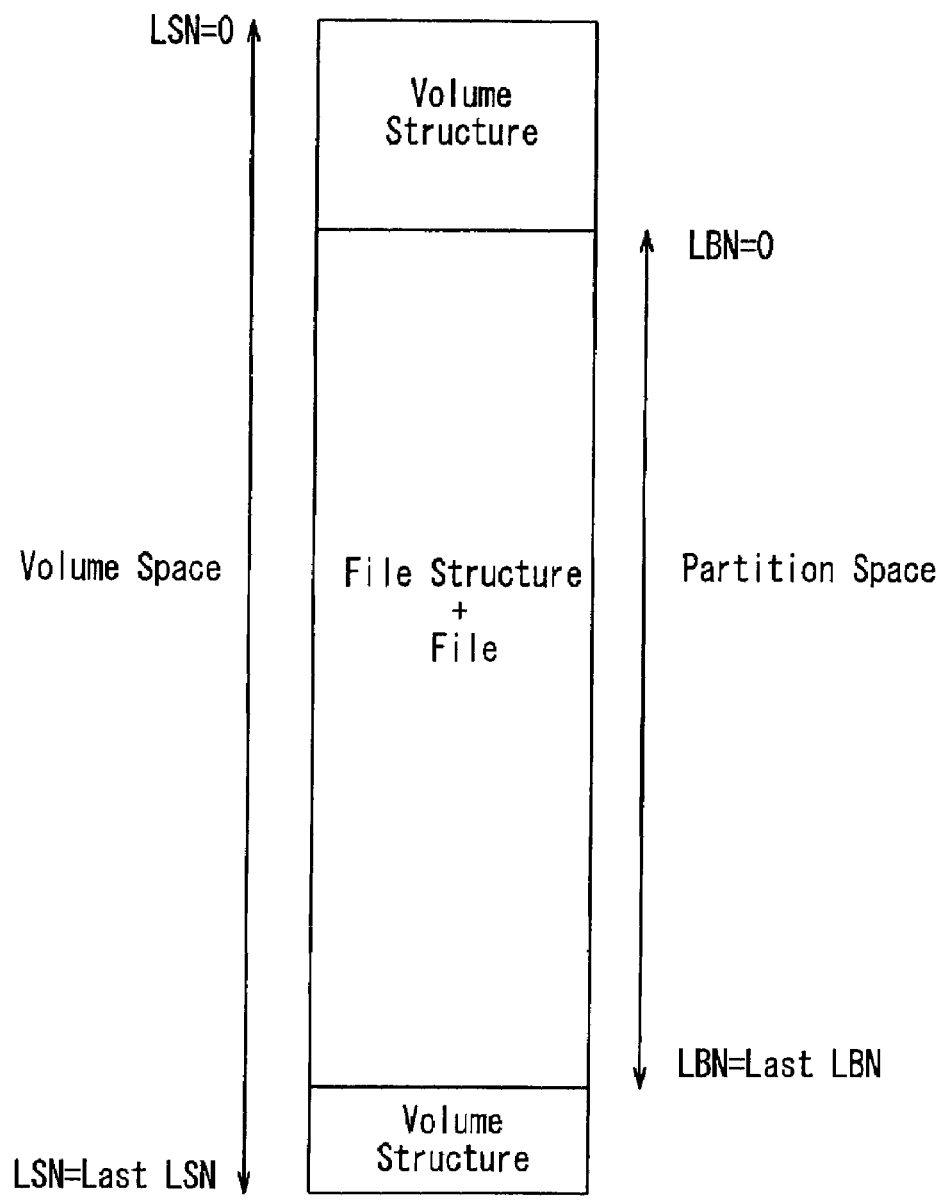
FIG. 24 shows an example of a structure of the volume space in the data recording/reproducing apparatus using the conventional file management method.
Figure 26:
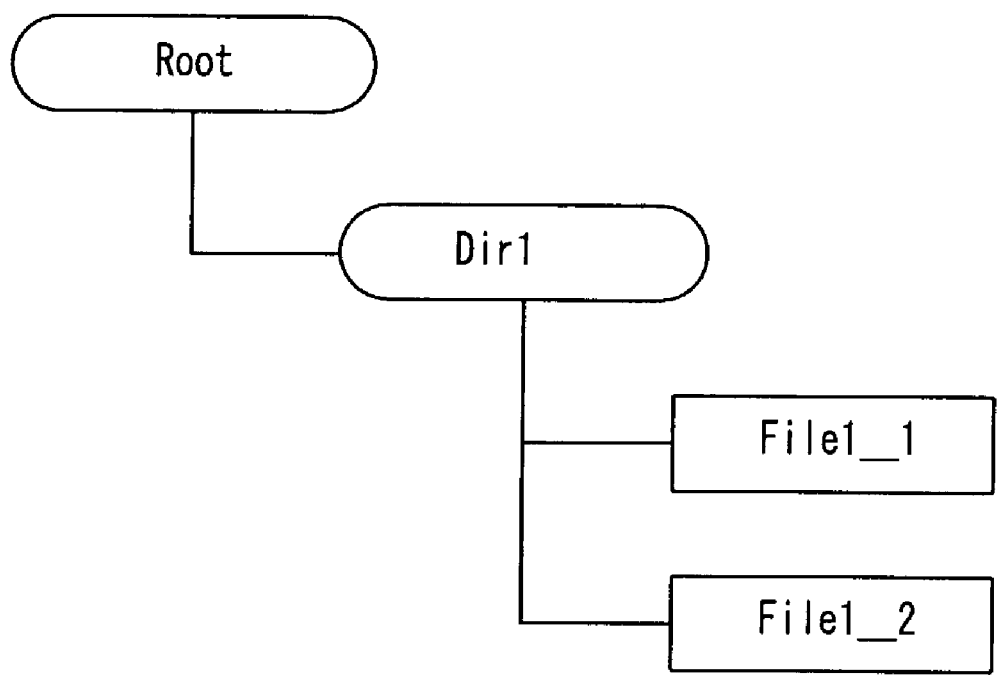
FIG. 26 shows an example of a directory structure in the data recording/reproducing apparatus using the conventional file management method.
Figure 31:
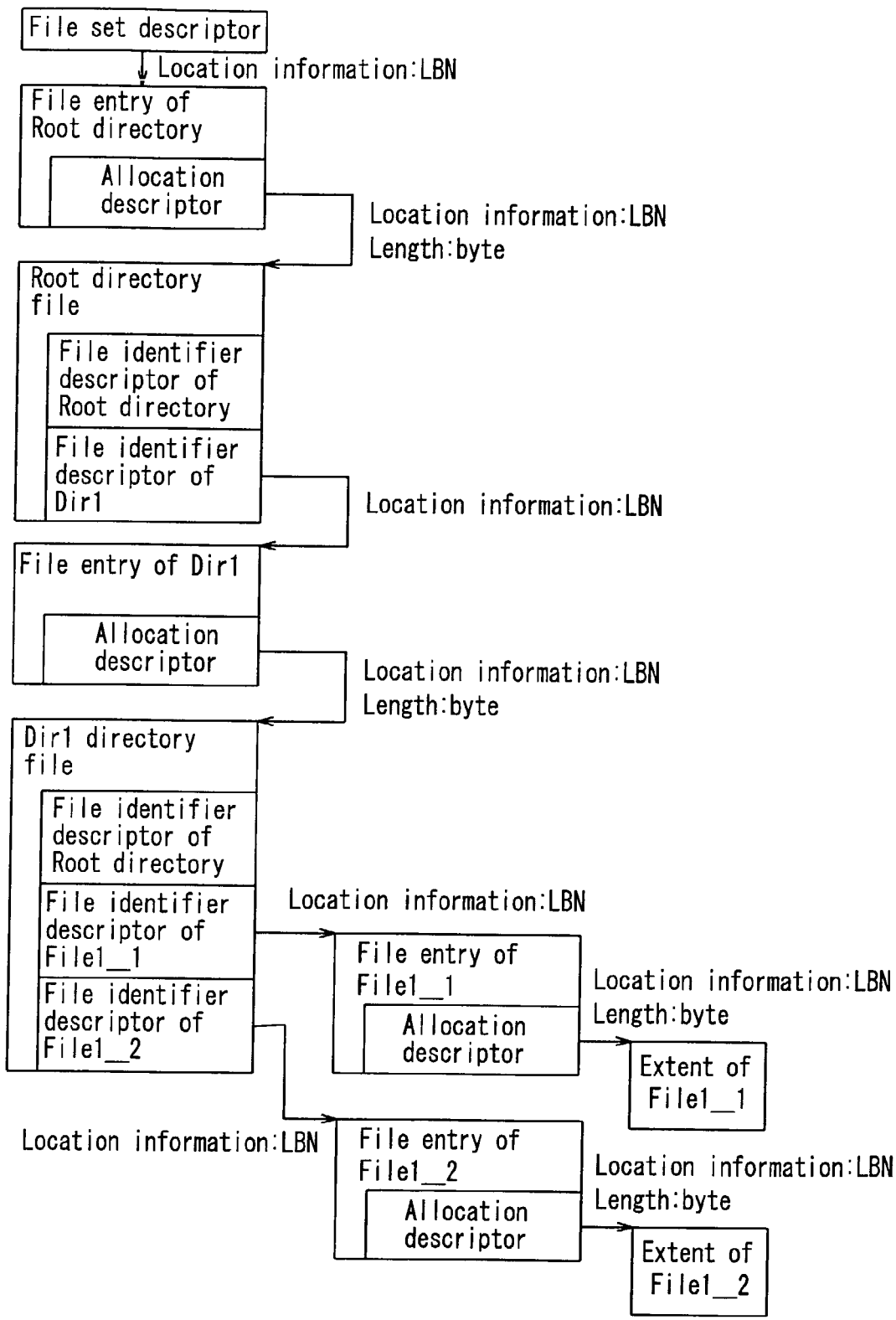
FIG. 31 shows an example of the hierarchical structure of a file in the data recording/reproducing apparatus using the conventional file management method.

When recording on the disc the AV_FILE11 as an AV file so as to be under the directory AV_DIR11 as illustrated in FIG. 13, the file identifier descriptor of the AV_FILE11 file is added at LBN=225 to 231, the file entry of the file AV_FILE11 is recorded at a logical block of LBN=384+A*4+1, which corresponds to an unallocated area, and data of the AV_FILE11 is recorded at LBN=384+A*4+2 or later. After this, recording is continued using similar procedures.

As stated above, according to Embodiment 7, a file entry indicating the specific directory and a file identifier descriptor indicating a specific directory are recorded together at a predetermined location. Thereby, the number of seek operations can be reduced in the process of adding and rewriting a file in the specific directory, so that recording and reproducing of a file having a real time property such as an AV file can be conducted easily.

Embodiment 8

The following describes a file management method according to Embodiment 8 of the present invention, with reference to the drawings. As in the case of Embodiment 7, a data structure of the partition space in a state where the file/directory structure shown in FIG. 11 is recorded on a disc to which the file management method according to Embodiment 8 of the present invention is applied is illustrated in FIG. 12.

At LBN=224, a file entry of the directory AV_DIR11 is recorded. At LBN=225 to 231, a file identifier descriptor of the directory AV_DIR11 as a parent directory is recorded. Hereafter, LBN=224 to 231 will be made a directory block of the directory AV_DIR11.

LBN=232 to 255 is an extent of the file AVFILES.IFO. As for this extent, the value of the upper 2 bits of the allocation descriptor is set so that the extent becomes "allocated" and "not recorded". Therefore, in the operation of the conventional file system, data cannot be written at LBN=232 to 255.

Similarly, LBN=384 to 384+A also is an extent of the AVFILES.IFO file, and the value of the upper 2 bits of the allocation descriptor is set so that the extent becomes "allocated" and "not recorded". Therefore, in the operation of the conventional file system, data cannot be written at LBN=384 to 384+A. This area is reserved for a file entry created in the directory AV_DIR11.

When recording on the disc the AV_FILE11 as an AV file so as to be under the directory AV_DIR11, the file identifier descriptor of the AV_FILE11 file is added at LBN=225 to 231, the file entry and the file attribute information of the file AV_FILE11 are recorded at the area of LBN=384 to 384+A, which is reserved for the AV_DIR11, and data of the AV_FILE11 is recorded at LBN=384+A*4+1 or later, which is a logical block of the disc corresponding to an unallocated area. After this, recording is continued using similar procedures.

As stated above, according to Embodiment 8, not only are a file entry indicating a specific directory and a file identifier descriptor indicating the specific directory recorded together at a predetermined location but also a file entry and file attribute information of a file in the specific directory are recorded together. Thereby, the number of seek operations can be reduced further compared with Embodiment 7, so that recording and reproducing of a file having a real time property such as an AV file can be conducted more easily.

Embodiment 9

The following describes a file management method according to Embodiment 9 of the present invention, with reference to the drawings. As in the case of Embodiment 7, a data structure of the partition space in a state where the file/directory structure shown in FIG. 11 is recorded on a disc to which the file management method according to Embodiment 9 of the present invention is applied is illustrated in FIG. 12.

At LBN=224, a file entry of the directory AV_DIR11 is recorded. At LBN=225 to 231, a file identifier descriptor of the directory AV_DIR11 as a parent directory is recorded. Hereafter, LBN=224 to 231 will be made a directory block of the directory AV_DIR11.

LBN=232 to 255 is an extent of the file AVFILES.IFO. As for this extent, the value of the upper 2 bits of the allocation descriptor is set so that the extent becomes "allocated" and "not recorded". Therefore, in the operation of the conventional file system, data cannot be written at LBN=232 to 255.

Hereafter, LBN=224 to 255 will be made a directory block group for recording videos.

At LBN=256, a file entry of the directory AV_DIR21 is recorded. At LBN=257 to 263, a file identifier descriptor of the directory AV_DIR21 as a parent directory is recorded. Hereafter, LBN=256 to 263 will be made a directory block of the directory AV_DIR21.

LBN=264 to 287 is an extent of the file AVFILES.IFO. As for this extent, the value of the upper 2 bits of the allocation descriptor is set so that the extent becomes "allocated" and "not recorded". Therefore, in the operation of the conventional file system, data cannot be written at LBN=264 to 287. Hereafter, LBN=256 to 287 will be made a directory block group for recording audio.

At LBN=288, a file entry of the directory AV_DIR31 is recorded. At LBN=289 to 295, a file identifier descriptor of the directory AV_DIR21 as a parent directory is recorded. Hereafter, LBN=288 to 295 will be made a directory block of the directory AV_DIR31.

LBN=296 to 319 is an extent of the file AVFILES.IFO. As for this extent, the value of the upper 2 bits of the allocation descriptor is set so that the extent becomes "allocated" and "not recorded". Therefore, in the operation of the conventional file system, data cannot be written at LBN=231 to 255. Hereafter, LBN=288 to 319 will be made a directory block group for recording still pictures.

At LBN=320, a file entry of the directory AV_DIR41 is recorded. At LBN=321 to 327, a file identifier descriptor of the directory AV_DIR41 as a parent directory is recorded. Hereafter, LBN=320 to 327 will be made a directory block of the directory AV_DIR41.

LBN=328 to 351 is an extent of the file AVFILES.IFO. As for this extent, the value of the upper 2 bits of the allocation descriptor is set so that the extent becomes "allocated" and "not recorded". Therefore, in the operation of the conventional file system, data cannot be written at LBN=231 to 255. Hereafter, LBN=288 to 319 will be made a directory block group for recording data other than an AV file.

When recording on the disc a Video_FILE11 as a video file so as to be under the directory AV_DIR11, as shown in FIG. 14, a file identifier descriptor of the file Video_FILE11 is added at LBN=225 to 231, a file entry of the file Video_FILE11 is recorded at LBN=Z+1, which is located at LBN=384+A*4+1 or later as a logical block of the disc corresponding to an unallocated area, and data of the file Video_FILE11 is recorded at LBN=Z+2 to V.

Next, when recording an Audio_FILE21 as an audio file under the directory AV_DIR21 also, as shown in FIG. 14, a file identifier descriptor of the file Audio_FILE21 is added at LBN=257 to 263, a file entry of the file Audio_FILE21 is recorded at LBN=V+1, which is a logical block of the disc corresponding to an unallocated area, and data of the file Audio_FILE21 is recorded at LBN=V+2 to W.

Further, when recording a Photo_FILE31 as a still picture file under the directory AV_DIR31, a file identifier descriptor of the file Photo_FILE31 is added at LBN=289 to 295, a file entry of the file Photo_FILE31 is recorded at LBN=W+

1, which is a logical block of the disc corresponding to an unallocated area, and data of the file Photo_FILE31 is recorded at LBN=W+2 to X.

Finally, when recording an Other_FILE41 as a file other than an AV file under the directory AV_DIR41, a file identifier descriptor of the file Other_FILE41 is added at LBN=321 to 327, a file entry of the file Other_FILE41 is recorded at LBN=X+1, which is a logical block of the disc corresponding to an unallocated area, and data of the file Other_FILE41 is recorded at LBN=X+2 to Y. After this, recording is continued using similar procedures.

As stated above, according to Embodiment 9, a file is classified according to a prescribed specification such as video and audio, and a file entry and a file identifier descriptor of such a file are recorded at a predetermined location, whereby a seek operation can be reduced to a minimum.

Embodiment 10

The following describes a file management method according to Embodiment 10 of the present invention, with reference to the drawings. As in the case of Embodiment 7, a data structure of the partition space in a state where the file/directory structure shown in FIG. 11 is recorded on a disc to which the file management method according to Embodiment 10 of the present invention is applied is illustrated in FIG. 12.

In FIG. 12, LBN=384 to 384+A is an extent of the file AVFILES.IFO. As for this extent, the value of the upper 2 bits of the allocation descriptor is set so that the extent becomes "allocated" and "not recorded". Therefore, in the operation of the conventional file system, data cannot be written at LBN=384 to 384+A. This area is reserved for a file entry that will be created in the directory AV_DIR11.

LBN=384+A+1 to 384+A*2 is an extent of the file AVFILES.IFO. As for this extent, the value of the upper 2 bits of the allocation descriptor is set so that the extent becomes "allocated" and "not recorded". Therefore, in the operation of the conventional file system, data cannot be written at LBN=384+A+1 to 384+A*2. This area is reserved for a file entry that will be created in the directory AV_DIR21.

Similarly, LBN=384+A*2+1 to 384+A*3 is an extent of the file AVFILES.IFO. As for this extent, the value of the upper 2 bits of the allocation descriptor is set so that the extent becomes "allocated" and "not recorded". Therefore, in the operation of the conventional file system, data cannot be written at 384+A*2+1 to 384+A*3. This area is reserved for a file entry that will be created in the directory AV_DIR31.

Similarly, LBN=384+A*3+1 to 384+A*4 is an extent of the file AVFILES.IFO. As for this extent, the value of the upper 2 bits of the allocation descriptor is set so that the extent becomes "allocated" and "not recorded". Therefore, in the operation of the conventional file system, data cannot be written at 384+A*3+1 to 384+A*4. This area is reserved for a file entry that will be created in the directory AV_DIR41.

When recording on the disc a Video_FILE11 as a video file so as to be under the directory AV_DIR11, as shown in FIG. 15, a file identifier descriptor of the file Video_FILE11 is added at LBN=225 to 231, a file entry and file attribute information of the file Video_FILE11 are recorded at an area of LBN=384 to 384+A, which is reserved for the AV_DIR11, and data of the file Video_FILE11 is recorded at LBN=Z+1 to V, which is located at LBN=384+A*4+1 or later as a logical block of the disc corresponding to an unallocated area.

Next, when recording an Audio_FILE21 as an audio file under the directory AV_DIR21 also, as shown in FIG. 15, a file identifier descriptor of the file Audio_FILE21 is added at LBN=225 to 231, a file entry and file attribute information of the file Audio_FILE21 are recorded at LBN=384+A+1 to 384+A*2, which is reserved for the AV_DIR21, and data of the file Audio_FILE21 is recorded at LBN=V+1 to W as a not recorded area.

Further, when recording a Photo_FILE31 as a still picture file under the directory AV_DIR31 also, as shown in FIG. 15, a file identifier descriptor of the file Photo_FILE31 is added at LBN=289 to 295, a file entry and file attribute information of the file Photo_FILE31 are recorded at LBN=384+A*2+1 to 384+A*3, which is reserved for the AV_DIR31, and data of the file Photo_FILE31 is recorded at LBN=W+1 to X as a not recorded area.

Finally, when recording an Other_FILE41 as a file other than an AV file under the directory AV_DIR41 also, as shown in FIG. 15, a file identifier descriptor of the file Other_FILE41 is added at LBN=321 to 327, a file entry and file attribute information of the file Other_FILE41 are recorded at LBN=384+A*3+1 to 384+A*4, which is reserved for the AV_DIR41, and data of the file Other_FILE41 is recorded at LBN=X+1 to Y as a not recorded area.

As stated above, according to Embodiment 10, not only a file is classified according to a prescribed specification such as video and audio and a file entry and a file identifier descriptor of such a file is recorded together at a predetermined location, but also a file entry and file attribute information of a file in a specific directory are brought together, whereby while suppressing seek operation, a procedure such as adding and rewriting of a file in the specific directory can be conducted.

Embodiment 11

The following describes a file management method according to Embodiment 11 of the present invention, with reference to the drawings. As in the case of Embodiment 7, a data structure of the partition space in a state where the file/directory structure shown in FIG. 11 is recorded on a disc to which the file management method according to Embodiment 11 of the present invention is applied is illustrated in FIG. 12.

LBN=352 to 383 is an extent of the file AVFILES.IFO. As for this extent, the value of the upper 2 bits of the allocation descriptor is set so that the extent becomes "allocated" and "not recorded". Therefore, in the operation of the conventional file system, data cannot be written at LBN=384 to 384+A.

This area is reserved for creating a new file identifier descriptor, when an area of the directory block group, which has been reserved already at LBN=224 to 351, is exhausted.

As stated above, according to Embodiment 11, an area of the directory block group which should be reserved additionally is reserved at a predetermined location, which can suppress a seek operation on the disc, while enables a procedure such as adding and rewriting of a file in a specific directory.

Embodiment 12

The following describes a file management method according to Embodiment 12 of the present invention, with reference to the drawings. As in the case of Embodiment 7, a data structure of the partition space in a state where the file/directory structure shown in FIG. 11 is recorded on a disc to which the file management method according to Embodiment 12 of the present invention is applied is illustrated in FIG. 12.

In Embodiment 8, when recording an AV file under the directory AV_DIR11, a file identifier descriptor of the file to be recorded is added at LBN=225 to 231, and at the same time a file entry and file attribute information of the file to be recorded are recorded at LBN=384 to 384+A, which is reserved for the directory AV_DIR11. However, the following case might be considered: that is, when an A-th file AV_FILE_A is recorded and a file identifier descriptor of the AV_FILE_A and a file entry and file attribute information of the AV_FILE_A are recorded, an area for recording a new file identifier descriptor or a new file entry and file attribute information might become insufficient in the directory block of the directory AV_DIR11.

In this case, when attempting to add a file AV_FILE_A+1 further, a new directory AV_DIR12 is created as shown in FIG. 16. Then, LBN=232 and LBN=233 to 239 are reserved as a directory block for recording a file entry of the directory AV_DIR12 and a file identifier descriptor of the directory AV_DIR12, respectively, so as to follow the directory block for recording of the file identifier descriptor of the director AV_DIR11 reserved at an area of LBN=224 to 231.

At the same time, an area of LBN=383+A*4+1 to 383+A*5 is reserved for recording a file entry and file attribute information of the AV_DIR12 in the same manner as in the area at LBN=384 to 384+A reserved for recording the file entry and file attribute information of the file for the directory AV_DIR11.

In a like manner as in the foregoing, a file identifier descriptor, a file entry and file attribute information of the file AV_FILE_A+1 are recorded as the A+1-th file at each of the reserved areas. In addition, data of the file AV_FILE_A+1 is recorded at LBN=X+1 to Y as a logical block on the disc corresponding to an unallocated area.

Similarly after this, recording is carried out so that a directory AV_DIR13 is added from the A*2+1-th file and a directory AV_DIR14 is added from the A*3+1-th file, until the capacity of the directory block group is exhausted.

As stated above, according to Embodiment 12, even when an operation such as adding a new file is performed in the case of the absence of a sufficient not-registered area for recording, a seek operation can be reduced to a minimum.

Embodiment 13

The following describes a file management method according to Embodiment 13 of the present invention, with reference to the drawings. As in the case of Embodiment 7, a data structure of the partition space in a state where the file/directory structure shown in FIG. 11 is recorded on a disc to which the file management method according to Embodiment 13 of the present invention is applied is illustrated in FIG. 12.

When recording is continued by the method described in Embodiment 12, in the case of recording an AV file under the directory AV_DIR14, a file identifier descriptor of the file to be recorded is added at LBN=249 to 255, and at the same time a file entry and file attribute information of the file to be recorded are recorded at LBN=383+A*6+1 to 383+A*7 reserved for the directory AV_DIR14, as shown in FIG. 17. However, when the A*4-th file AV_FILE_A*4 is recorded and a file identifier descriptor of the AV_FILE_A*4 and a file entry and file attribute information of the AV_FILE_A*4 are recorded, then an area for recording a new file identifier descriptor, or a new file entry and file attribute information might become lost in a directory block of the directory AV_DIR14.

In this case, when attempting to add a file AV_FILE_A*4+1 further, in spite of the intention of creating a directory AV_DIR15 in the directory block group by the method described in Embodiment 12, an area for adding a file identifier descriptor cannot be reserved because the directory block group has been exhausted already.

Then, as shown in FIG. 18, a new directory block group is created in the reserved area at LBN=352 to 383, which is reserved in Embodiment 11, and the directory AV_DIR15 is created therein. Thereby, LBN=352 and LBN=353 to 359 are reserved as a directory block for recording a file entry of the directory AV_DIR15 and a file identifier descriptor of the directory AV_DIR15, respectively.

At the same time, in a like manner as the area reserved at LBN=383+A*6+1 to 383+A*7 for recording the file entry and file attribute information of the file for the directory AV_DIR14, an area of LBN=383+A*7+1 to 383+A*8 is reserved for recording a file entry and file attribute information of the directory AV_DIR15.

With this method, a file identifier descriptor, a file entry and file attribute information can be recorded at each of the reserved areas as the A*4+1-th file in a similar manner as in the foregoing. In addition, data of the AV_FILE_A*4+1 is recorded at LBN=X+1 to Y as a logical block on the disc corresponding to an unallocated area. After this, recording is continued by a similar procedure.

Further, in the case of the absence of an area for recording a new file identifier descriptor or a new file entry and file attribute information in the directory block in the directory AV_DIR15 when the A*5-th file AV_FILE_A*5 is recorded, recording is carried out in a like manner described in Embodiment 12 so that a directory AV_DIR16 is added from the A*5+1-th file and a directory AV_DIR17 is added from the A*6+1-th file, until the capacity of the directory block group is exhausted.

As stated above, according to Embodiment 13, when a file entry or the like is recorded by classifying it according to a prescribed specification, and even when a sufficient not-registered area for recording is exhausted and a procedure such as adding a new file is conducted, a seek operation can be reduced to a minimum.

Embodiment 14

The following describes a file management method according to Embodiment 14 of the present invention, with reference to the drawings. As in the case of Embodiment 7, a data structure of the partition space in a state where the file/directory structure shown in FIG. 11 is recorded on a disc to which the file management method according to Embodiment 14 of the present invention is applied is illustrated in FIG. 12.

When recording is continued by the method described in Embodiment 13, in the case of recording an AV file under the directory AV_DIR18 as shown in FIG. 19, a file identifier descriptor of the file to be recorded is added at LBN=377 to 383, and at the same time a file entry and file attribute information of the file to be recorded are recorded at LBN=383+A*10+1 to 383+A*11, which is reserved for the directory AV_DIR18. However, when the A*8-th file AV_FILE_A*8 is recorded and a file identifier descriptor of the AV_FILE_A*8 and a file entry and file attribute information of the AV_FILE_A*8 are recorded, then an area for recording a new file identifier descriptor, or a new file entry and file attribute information might become insufficient in a directory block of the directory AV_DIR18.

In this case, when attempting to add a file AV_FILE_A*8+1 further, in spite of the intention of creating a directory AV_DIR19 in the directory block group by the method described in Embodiment 12, an area for adding a file identifier descriptor cannot be reserved because the directory block group has been exhausted already. In addition, although it can be considered that the directory block reserved and designated by the method described in Embodiment 11 is used, such an area has been used already, so that there is no area for adding.

In this case, as shown in FIG. 20, at the initially reserved and the remaining LBN=384+A*11+1 to Z in the area reserved for a file entry and file attribute information conventionally, a new directory block group is created, and a directory AV_DIR19 is created in the directory block group. Then, LBN=384+A*11+1 and LBN=384+A*11+2 to 384+A*11+8 are reserved as a directory block for recording a file entry of the directory AV_DIR19 and a file identifier descriptor of the directory AV_DIR19, respectively.

At the same time, in a like manner as the area reserved at the area of LBN=384+A*10+1 to 384+A*11 for recording the file entry and file attribute information of the file for the directory AV_DIR18, an area of LBN=383+A*11+33 to 384+A*12+32 is reserved for recording a file entry and file attribute information of the directory AV_DIR19.

Then, a file identifier descriptor, a file entry and file attribute information are recorded at each of the reserved areas as the A*8+1-th file in a similar manner as in the foregoing. In addition, data of the AV_FILE_A*8+1 is recorded at LBN=X+1 or later as a logical block on the disc corresponding to an unallocated area. After this, recording is continued by a similar procedure.

Further, in the case of the absence of an area for recording a new file identifier descriptor or a new file entry and file attribute information in the directory block in the directory AV_DIR15 when the A*9-th file AV_FILE_A*9 is recorded, recording is carried out in a like manner described in Embodiment 12 so that a directory AV_DIR110 is added from the A*9+1-th file and a directory AV_DIR111 is added from the A*10+1-th file, until the capacity of the directory block group is exhausted.

As stated above, according to Embodiment 14, a reserved area is used effectively, so that even when there is no sufficient not-registered area for recording and an operation such as adding a new file is conducted, a seek operation can be reduced to a minimum.

Embodiment 15

The following describes a file management method according to Embodiment 15 of the present invention, with reference to the drawings. As in the case of Embodiment 7, a data structure of the partition space in a state where the file/directory structure shown in FIG. 11 is recorded on a disc to which the file management method according to Embodiment 15 of the present invention is applied is illustrated in FIG. 12.

When recording is continued by the method described in Embodiment 13, in the case of recording an AV file under the directory AV_DIR18 as shown in FIG. 21, a file identifier descriptor of the file to be recorded is added at LBN=384+A*11+26 to 384+A*11+32, and at the same time a file entry and file attribute information of the file to be recorded are recorded at an area of LBN=384+A*14+33 to Z, which is reserved for the directory AV_DIR14. However, when the A*12-th file AV_FILE_A*12 is recorded and a file identifier descriptor of the AV_FILE_A*12 and a file entry and file attribute information of the AV_FILE_A*12 are recorded, then an area for recording a new file identifier descriptor, or a new file entry and file attribute information might become insufficient in a directory block of the directory AV_DIR18.

In this case, when attempting to add a file AV_FILE_A*12+1 further, in spite of the intention of creating a directory AV_DIR113 in the directory block group by the method described in Embodiment 12, an area for adding a file identifier descriptor cannot be reserved because the directory block group has been exhausted already.

In addition, in spite of the intention of using the directory block reserved and designated by the method described in Embodiment 11 according to the method described in Embodiment 13, such an area also has been used already, so that there is no area for adding. Furthermore, in spite of the intention of reserving a new directory block group in the reserved area by the method described in Embodiment 14, in the case of exhausting the reserved area until LBN=Z, which is reserved for a file entry and file attribute information conventionally, there is no area for adding in the reserved area.

In this case, as shown in FIG. 22, in the remaining LBN=Y+1 to Last LBN in an unallocated area in which an entity of a file is recorded, a reserved area like the reserved area created at the time of creation of the initial partition space is reserved newly at LBN=Y+1 to ZZ. Then, a directory block group is created in the newly reserved area, and the directory AV_DIR113 is created in the directory block group. LBN=X+1 and LBN=X+2 to X+8 are reserved as a directory block for recording a file entry of the directory AV_DIR113 and a file identifier descriptor of the directory AV_DIR113, respectively.

At the same time, in a like manner as the area reserved at the area of LBN=Y+1 to Y+A for recording the file entry and file attribute information of the file for the directory AV_DIR113, an area of LBN=384+A*11+33 to 384+A*12+32 is reserved for recording a file entry and file attribute information of the directory AV_DIR113.

Then, a file identifier descriptor, a file entry and file attribute information are recorded at each of the reserved areas as the A*12+1-th file in a similar manner as in the foregoing. In addition, data of the AV_FILE_A*12+1 is recorded at LBN=X+1 or later as a logical block on the disc corresponding to an unallocated area. After this, recording is continued by a similar procedure.

Further, in the case of the absence of an area for recording a new file identifier descriptor or a new file entry and file attribute information in the directory block in the directory AV_DIR113 when the A*12-th file AV_FILE_A*12 is recorded, recording is carried out in a like manner described in Embodiment 12 so that a directory AV_DIR114 is added from the A*12+1-th file and a directory AV_DIR115 is added from the A*13+1-th file, until the capacity of the directory block group is exhausted.

As stated above, according to Embodiment 15, even when there is no space area in the reserved area, and when there is no sufficient not-registered area for recording and a procedure such as adding a new file is conducted, a seek operation can be reduced to a minimum by utilizing the space area of the disc.

INDUSTRIAL APPLICABILITY

As stated above, according to the file management methods of the present invention, file management information and attribute information on an AV file are recorded at a contiguous area reserved in advance, whereby a seek operation with respect to a disc can be reduced, and therefore real-time recording/reproducing of the AV file can be realized.

The invention claimed is:

1. A file management method that has file management information for managing contiguous blocks on a disc as an extent and for grouping the extent as a file and managing the file, comprising:
  when creating a new directory on the disc, reserving as a reserved area, for recording file management information on the file, a file or a data area in the directory; and
  reserving a directory block having a predetermined size in the reserved area for recording a file entry of the directory and a file identifier descriptor of the directory,
  wherein an area is reserved as a directory block group in a size of an arbitrary integral multiple of a size of the directory block,
  wherein concurrently with the process of reserving the directory block group, an area for recording for a file entry, which corresponds to a required area for recording the file whose file identifier descriptor can be described in the directory, and at least a portion of the file is reserved in the reserved area initially and at one time.

2. The file management method according to claim 1, wherein the size of the directory block group is in a unit of error correction.

3. The file management method according to claim 1, wherein concurrently with the process of reserving the directory area, an area for recording for a file entry, which corresponds to a required area for recording the file whose file identifier descriptor can be described in the directory, and at least a portion of the file is reserved in the reserved area initially and at one time.

4. The file management method according to claim 3, wherein when creating a new file, the directory block group is created newly at the area reserved beforehand as the directory block group.

5. The file management method according to claim 3, wherein when, in the reserved directory block group, any one of the area for information concerning the file identifier descriptor in the directory and the reserved area for recording the file entry and at least a portion of the file becomes insufficient and when a new file further is created, the directory block group is created newly at the area reserved beforehand as the directory block group, and at the same time an area for recording for a file entry, which corresponds to a required area for recording the file whose file identifier descriptor can be described in the directory, and at least a portion of the file is reserved in the reserved area at one time.

6. The file management method according to claim 3, wherein when creating a new file, the directory block group is created newly in the reserved area.

7. The file management method according to claim 3, wherein when in the reserved directory block group, any one of the area for information concerning the file identifier descriptor in the directory and the reserved area for recording the file entry and at least a portion of the file becomes insufficient, the area reserved beforehand as the directory block group also becomes insufficient, and when a new file is created, the directory block group is created newly in the reserved area, and at the same time an area for recording for a file entry, which corresponds to a required area for recording the file whose file identifier descriptor can be described in the directory, and at least a portion of the file is reserved in the reserved area at one time.

8. The file management method according to claim 3, wherein when creating a new file, the reserved area is reserved newly in a space area of the disc, and the directory block group is created in the thus prepared reserved area.

9. The file management method according to claim 3, wherein, when, in the reserved directory block group, the area for recording the file identifier descriptor in the directory becomes insufficient, the area reserved beforehand as the directory block become insufficient and an area for reservation is insufficient in the reserved area that has been reserved initially, and when a new file is created, the reserved area is reserved newly in a space area of the disc, the directory block group is created in the thus prepared reserved area, and at the same time an area for recording for a file entry, which corresponds to a required area for recording the file whose file identifier descriptor can be described in the directory, and at least a portion of the file is reserved in the thus prepared reserved area at one time.

10. A file management method that has file management information for managing contiguous blocks on a disc as an extent and for grouping the extent as a file and managing the file, comprising:
  when creating a new directory on the disc, reserving as a reserved area, for recording file management information on the file, a file or a data area in the directory; and
  reserving a directory block having a predetermined size in the reserved area for recording a file entry of the directory and a file identifier descriptor of the directory,
  wherein an area is reserved as a directory block group in a size of an arbitrary integral multiple of a size of the directory block,
  wherein an area is reserved as a directory area in a size of an arbitrary integral multiple of a size of the directory block group,
  wherein when creating a new file, the directory block is created newly at the end of the reserved directory block.

11. The file management method according to claim 10, wherein the size of the directory block group is in a unit of error correction.

12. A file management method that has file management information for managing contiguous blocks on a disc as an extent and for grouping the extent as a file and managing the file, comprising:
  when creating a new directory on the disc, reserving as a reserved area, for recording file management information on the file, a file or a data area in the directory; and
  reserving a directory block having a predetermined size in the reserved area for recording a file entry of the directory and a file identifier descriptor of the directory,
  wherein an area is reserved as a directory block group in a size of an arbitrary integral multiple of a size of the directory block,
  wherein an area is reserved as a directory area in a size of an arbitrary integral multiple of a size of the directory block group,
  wherein when, in the reserved directory block group, any one of the area for information concerning the file identifier descriptor in the directory and the reserved area for recording the file entry and at least a portion of the file becomes insufficient and when a new file further is created, the directory block is created newly at the end of the reserved directory block, and at the same time an area for recording for a file entry, which corresponds to a required area for recording the file whose file identifier descriptor can be described in the directory, and at least a portion of the file is reserved in the reserved area at one time.

13. The file management method according to claim 12, wherein the size of the directory block group is in a unit of error correction.

* * * * *